US012643048B2

(12) United States Patent
Nowakowski et al.

(10) Patent No.: US 12,643,048 B2

(45) Date of Patent: Jun. 2, 2026

(54) METHOD FOR CREATING AN AUTOMOTIVE MIXED-REALITY GAMING SYSTEM

(71) Applicant: VALEO COMFORT AND DRIVING ASSISTANCE, Créteil (FR)

(72) Inventors: Christopher Nowakowski, San Mateo, CA (US); Sonam Negi, San Mateo, CA (US); Anushalakshmi Manila, San Mateo, CA (US); Nicodemus Estee, San Mateo, CA (US); Jaime Almeida, San Mateo, CA (US); Anthony Amos, San Mateo, CA (US)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 258 days.

(21) Appl. No.: 18/451,351

(22) Filed: Aug. 17, 2023

(65) Prior Publication Data

US 2025/0058226 A1    Feb. 20, 2025

(51) Int. Cl.
*A63F 13/65* (2014.01)
*A63F 13/216* (2014.01)
(Continued)

(52) U.S. Cl.
CPC ............ *A63F 13/65* (2014.09); *A63F 13/216* (2014.09); *A63F 13/217* (2014.09);
(Continued)

(58) Field of Classification Search
CPC ...... A63F 13/65; A63F 13/216; A63F 13/217; A63F 13/533; A63F 13/803; A63F 13/21;
(Continued)

(56) References Cited

U.S. PATENT DOCUMENTS 11,107,281 B2 * 8/2021 Hermina Martinez ..................... H04N 7/142
11,571,622 B2 2/2023 Mehdi et al.
(Continued)

OTHER PUBLICATIONS

International Search Report in corresponding International Application No. PCT/US2024/041498, dated Nov. 15, 2024 (3 pages).
(Continued)

*Primary Examiner* — Omkar A Deodhar

(74) *Attorney, Agent, or Firm* — Osha Bergman Watanabe & Burton LLP

(57) ABSTRACT

An automotive mixed-reality gaming system for a vehicle includes vehicle sensors that collect vehicle data associated with movements and a position of the vehicle along a roadway, detection sensors that collect environmental data associated with an external environment of the vehicle, and a processing unit including a processor and a memory. The processing unit receives data from the vehicle sensors and the detection sensors, converts the environmental data to a game-centric coordinate system stored in the memory, and generates an interactive gameplay application including a mixed-reality environment and a virtual avatar based on the game-centric coordinate system. Further, the processing unit transmits the application to mobile devices, receives user input from the mobile devices, and controls the activity of the avatar and settings of the gameplay based on the vehicle data and user input. The avatar traverses the mixed-reality environment at a rate proportional to the vehicle.

19 Claims, 13 Drawing Sheets

(51) Int. Cl.

| | | |
|---|---|---|
| *A63F 13/217* | (2014.01) | |
| *A63F 13/533* | (2014.01) | |
| *A63F 13/803* | (2014.01) | |
| *B60R 16/023* | (2006.01) | |

(52) U.S. Cl.
CPC .......... *A63F 13/533* (2014.09); *A63F 13/803* (2014.09); *B60R 16/0231* (2013.01)

(58) Field of Classification Search
CPC ........ A63F 13/211; A63F 13/23; A63F 13/40; A63F 13/428; A63F 13/45; A63F 13/50; A63F 13/52; A63F 13/58; A63F 2300/8017; A63F 2300/8082; A63F 2300/6646; A63F 2300/65; A63F 2300/66
See application file for complete search history.

(56) References Cited

U.S. PATENT DOCUMENTS

| | | | |
|---|---|---|---|
| 2013/0083061 A1* | 4/2013 | Mishra .................. | A63F 13/803 |
| | | | 345/633 |
| 2020/0257412 A1 | 8/2020 | Wagner et al. | |
| 2022/0047951 A1 | 2/2022 | Mehdi et al. | |

OTHER PUBLICATIONS

Written Opinion in corresponding International Application No. PCT/US2024/041498, dated Nov. 15, 2024 (10 pages).

* cited by examiner

Start

Obtain environmental data and vehicle data

Identify environmental objects in the image frame

Post process identified environmental objects

Determine augmentation content

Render an augmented image frame

Display the augmented image frame

End

510

520

530

540

550

560

500

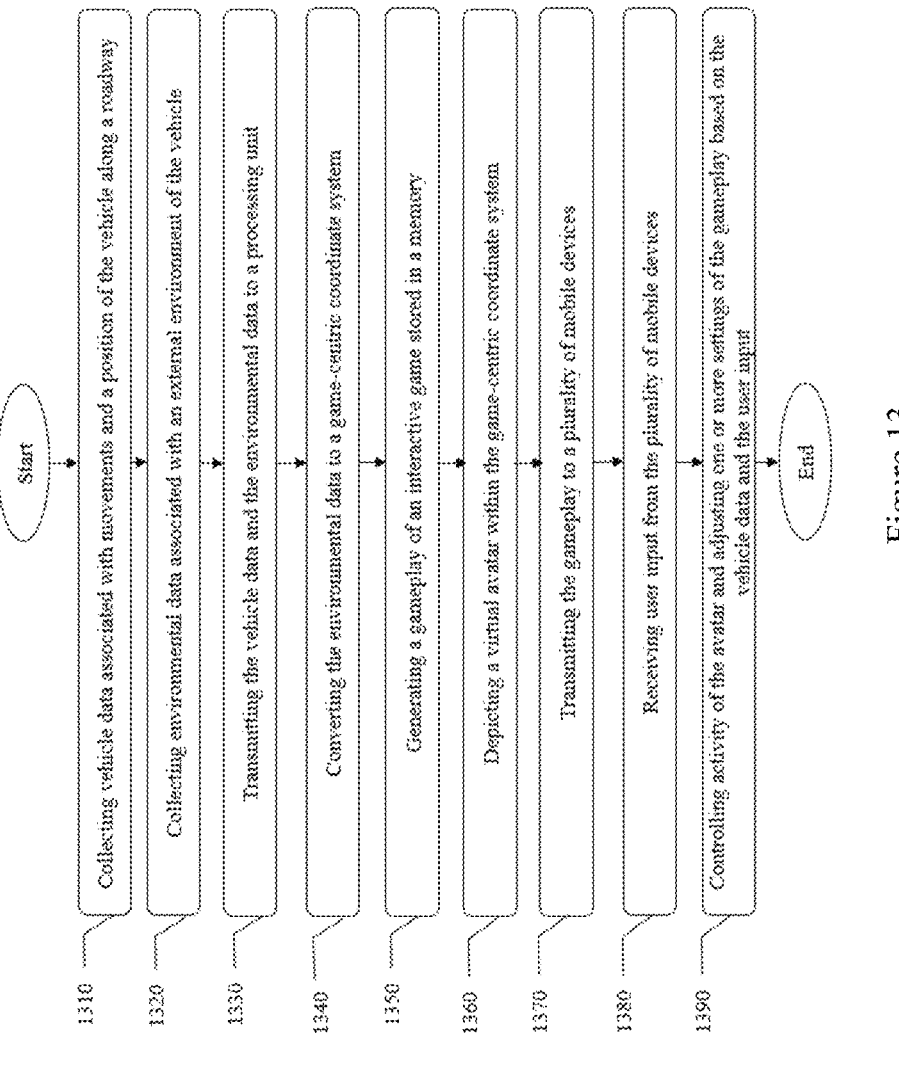

1300

1310 — Collecting vehicle data associated with movements and a position of the vehicle along a roadway 1320 — Collecting environmental data associated with an external environment of the vehicle 1330 — Transmitting the vehicle data and the environmental data to a processing unit 1340 — Converting the environmental data to a game-centric coordinate system 1350 — Generating a gameplay of an interactive game stored in a memory 1360 — Depicting a virtual avatar within the game-centric coordinate system 1370 — Transmitting the gameplay to a plurality of mobile devices 1380 — Receiving user input from the plurality of mobile devices 1390 — Controlling activity of the avatar and adjusting one or more settings of the gameplay based on the vehicle data and the user input Start End

Figure 13

METHOD FOR CREATING AN AUTOMOTIVE MIXED-REALITY GAMING SYSTEM

BACKGROUND

Modern entertainment systems of vehicles may permit passengers of the vehicle to listen to audio and watch video. Some advanced entertainment systems may even include computers and/or gaming consoles. Accordingly, the passengers of vehicles that include such advanced entertainment systems are provided the opportunity to play video games while the vehicle is traveling.

In addition, vehicles are increasingly equipped with numerous sensors. Such sensors include, for example, cameras, LIDAR sensors, ultrasonic sensors, etc. These sensors may support driver assistance systems and/or implementations of autonomous driving. Other applications may benefit from the availability of signals obtained from these sensors.

SUMMARY

One or more embodiments of the present invention relates to an automotive mixed-reality gaming system for a vehicle that includes vehicle sensors that collect vehicle data associated with movements and a position of the vehicle along a roadway, detection sensors that collect environmental data associated with an external environment of the vehicle, and a processing unit including a processor and a memory. The processing unit receives data from the vehicle sensors and the detection sensors, converts the environmental data to a game-centric coordinate system stored in the memory, and generates an interactive gameplay application including a mixed-reality environment and a virtual avatar based on the game-centric coordinate system. Further, the processing unit transmits the application to mobile devices, receives user input from the mobile devices, and controls the activity of the avatar and settings of the gameplay based on the vehicle data and user input. The avatar traverses the mixed-reality environment at a rate proportional to the vehicle.

One or more embodiments of the present invention relates to a method for operating an automotive mixed-reality gaming system for a vehicle. The method includes collecting vehicle data associated with movements and a position of the vehicle along a roadway, collecting environmental data associated with an external environment of the vehicle, transmitting the vehicle data and the environmental data to a processing unit, converting the environmental data to a game-centric coordinate system stored in the memory, and generating an interactive gameplay application including a mixed-reality environment and a virtual avatar based on the game-centric coordinate system. The method further includes, transmitting the gameplay to a plurality of mobile devices, receiving user input from the plurality of mobile devices, and controlling activity of the avatar and adjusting one or more settings of the gameplay based on the vehicle data and the user input.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 13 shows a flowchart of a method in accordance with one or more embodiments disclosed herein.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards automotive mixed-reality gaming systems for a vehicle and methods of use for such mixed-reality gaming systems. The techniques discussed in this disclosure may advantageously be implemented on mobile devices of passengers of the vehicle. Further, the techniques discussed in this disclosure advantageously utilize a plurality of video feeds captured by a plurality of detection sensors of the vehicle as a backdrop for the gameplay in addition to employing vehicle data. Additionally, the techniques discussed in this disclosure are beneficial in implementing environmental objects and weather conditions of an external environment of the vehicle detected by the plurality of detection sensors as interactive elements within the gameplay.

Figure 1:
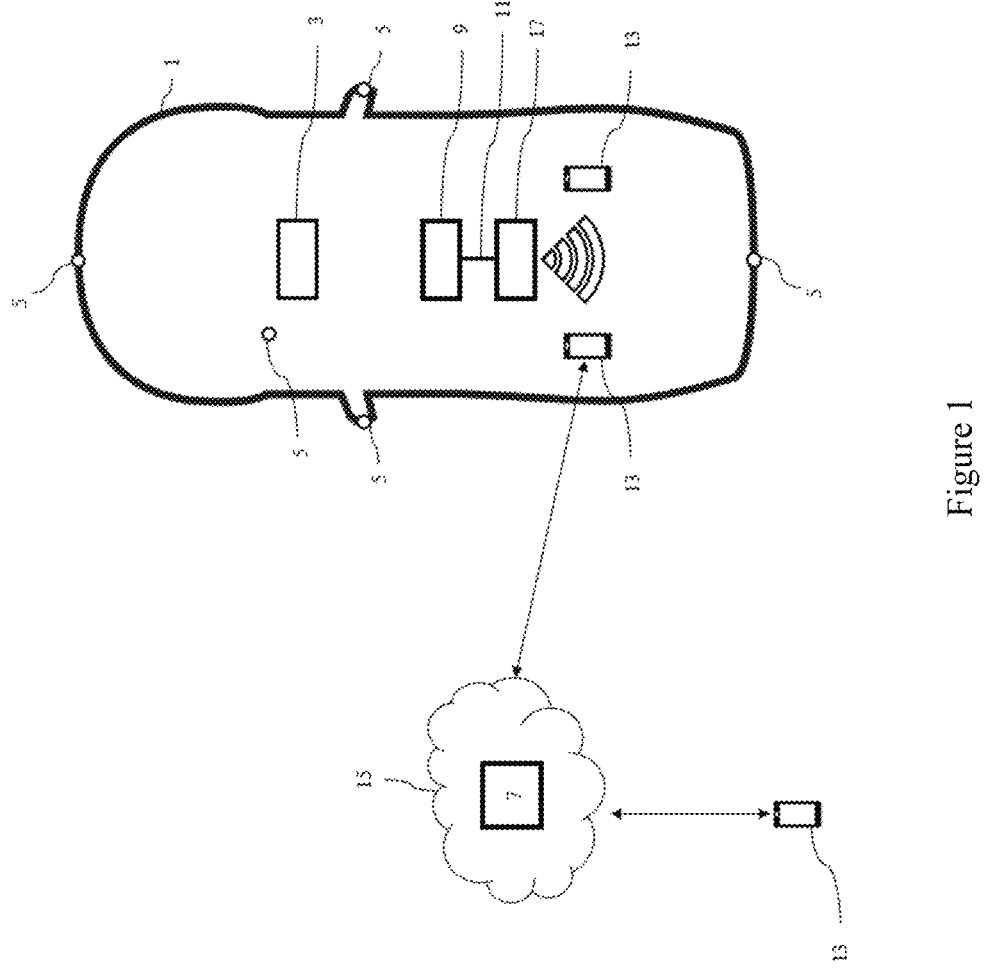
FIG. 1 shows a system in accordance with one or more embodiments disclosed herein.

FIG. 1 depicts an example of a vehicle 1 in accordance with one or more embodiments disclosed herein. The vehicle 1 may be a passenger car, a bus, or any other type of vehicle 1. As shown in FIG. 1, a vehicle 1 includes a plurality of vehicle sensors 3, a plurality of detection sensors 5, and a processing unit 7. In addition, the vehicle 1 may further include an infotainment module 9. Components of the vehicle 1 are interconnected through the use of a bus 11, which is at least one wire, wiring harness, and/or connector that serve to transmit data throughout the vehicle 1.

The plurality of vehicle sensors 3 collect vehicle data (not shown) associated with the movements and the position of the vehicle 1 along a current roadway of the vehicle 1. For example, the plurality of vehicle sensors 3 may be able to measure and/or record vehicle data such as the current speed, acceleration, steering angle, yaw rate, braking status, blind-spot and proximity alerts, etc. Further, the plurality of vehicle sensors 3 may include a navigational sensor (not shown). The navigational sensor receives a signal that includes global coordinates of the vehicle 1. The navigational sensor may be a Global Positioning System (GPS) sensor, for example, or an equivalent sensor that determines the location of the vehicle 1 in relation to the external environment of the vehicle 1, and may employ trilateration, triangulation, or similar procedures to determine the position thereof. The signal may also include information such as the direction and speed of the vehicle 1. The direction and speed may be derived by comparing the global coordinates to their previous counterparts to determine the length of time that the vehicle 1 was traveling between two points. The signal may further include information associated with the coordinates themselves, such as, for example, which country the coordinates are located in, or a designated speed limit of a roadway that the coordinates are located in.

In addition to the plurality of vehicle sensors 3, the vehicle 1 includes a plurality of detection sensors 5 that collect quantitative, environmental data (e.g., FIG. 3) associated with the external environment of the vehicle 1. The external environment may include elements such as, for example, roadways, other traffic including additional vehicles (e.g., FIG. 4A), pedestrians, buildings, etc. As such, the vehicle 1 may move in the external environment such that the vehicle 1 traverses the external environment.

Examples of a detection sensor 5 include a two-dimensional camera, a three-dimensional or stereoscopic camera, a radar unit, a LIDAR unit, an ultrasonic sensor, or an equivalent sensor or component that perceives the environment of the vehicle 1. The plurality of detection sensors 5 may all be the same type of detection sensor 5 or include a combination of detection sensors 5 that vary in type.

Figure 2:
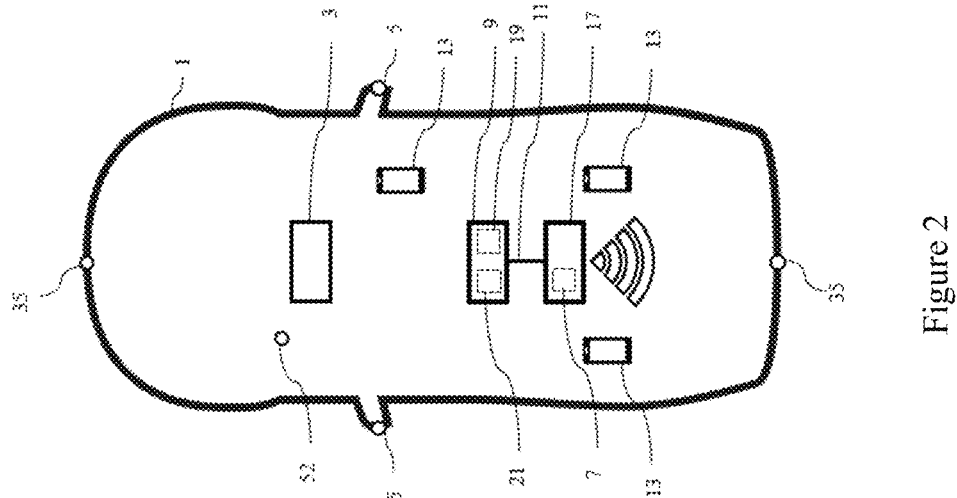
FIG. 2 shows a system in accordance with one or more embodiments disclosed herein.

In one or more embodiments, the plurality of detection sensors 5 includes a plurality of visual sensors (e.g., FIG. 2). Each visual sensor may capture a video feed (not shown) associated with a field of view of the external environment of the vehicle 1 from a front position, a rear position, and/or a side position of the exterior or interior of the vehicle 1. Each video feed may be formed of a series of image frames (not shown). The series of image frames may be processed and subsequently displayed on a plurality of mobile devices 13 and/or an infotainment module 9 of the vehicle 1. In one or more embodiments, the series of image frames are augmented prior to displaying on the plurality of mobile devices 13 and/or the infotainment module 9.

In one or more embodiments, and as depicted in FIG. 1, a server 15 may include a processing unit 7 in wireless communication with a plurality of mobile devices 13 and/or an Electronic Control Unit (ECU) 17 of the vehicle 1. The processing unit 7 includes one or more processors (e.g., FIG. 11) and a memory (e.g., FIG. 11). The plurality of mobile devices 13 may be personal devices of passengers of the vehicle 1 brought into the vehicle 1 by the passengers. The plurality of mobile devices 13 may be embodied as smart phones, tablets, and mobile gaming devices. Passengers of the vehicle 1 may utilize the plurality of mobile devices 13 to play an interactive gaming application with a gameplay including a mixed-reality environment (e.g., FIG. 4B) that utilizes the vehicle data and environmental data collected by the plurality of vehicle sensors 3 and the plurality of detection sensors 5, respectively.

The plurality of mobile devices 13 transmit user input (e.g., FIG. 3) to the processing unit 7 in order to control activity within the gameplay and/or adjust one or more settings (not shown) of the gameplay. In one or more embodiments, the plurality of mobile devices 13 are connected to the vehicle 1 by wired or wireless technologies (e.g., WiFi, Bluetooth, etc.). Alternatively, both the vehicle 1 and the plurality of mobile devices 13 may be connected to the cloud-based server 15 of the processing unit 7 via wireless technologies (e.g., cellular, 4G, 5G, satellite, etc.), bypassing the need for the plurality of mobile devices 13 to connect directly to the vehicle 1. In one or more embodiments, a mobile device 13 of the plurality of mobile devices 13 may be located outside of the vehicle 1 and communicate with the server 15.

The transfer of the series of image frames (e.g., from the plurality of detection sensors 5 to the plurality of mobile devices 13) may be performed via the server 15, as depicted in FIG. 1. That is, augmentation and/or other operations may be performed in the server 15. The augmentation process of the series of image frames is further detailed in FIGS. 3 and 5.

In one or more embodiments, an infotainment module 9 of the vehicle 1 may be employed to display the gameplay or features of the gameplay to passengers of the vehicle 1. As depicted in FIG. 2, the infotainment module 9 may include a display system 19 and an interface 21. The display system 19 may receive the gameplay or informational data associated with the gameplay from the processing unit 7 wirelessly or via the bus 11. Further, the display system 19 displays the received gameplay or informational data associated with the gameplay to the passengers of the vehicle 1. The display system 19 may be a Liquid Crystal Display (LCD), Organic Light-Emitting Diode (OLED), or equivalent display.

The interface 21 of the infotainment module 9 is utilized to receive user interaction with the infotainment module 9. The interface 21 may include dials, buttons, or knobs. In one or more embodiments, the interface 21 may be a touchscreen of the display system 19. Further, in one or more embodiments, interface devices (e.g., wired and wireless gaming controllers, mobile devices 13, etc.) may be connected to the interface 21 of the infotainment module 9 via wired or wireless connections in order to transmit user input to the infotainment module 9. User input captured via the interface 21 of the infotainment module 9 is transmitted to the processing unit 7. The infotainment module 9 may further allow the configuration of one or more settings of the gameplay. In addition, the infotainment module 9 may be employed to control activity within the gameplay in place of a mobile device 13.

In one or more embodiments, the processing unit 7 and/or the infotainment module 9 may transmit the gameplay to other mobile devices 13 of the passengers of the vehicle 1 that are in the form of augmented-reality glasses or virtual-reality headsets. In such a case, the infotainment module 9 may be employed to configure these forms of mobile devices 13 prior to the gameplay being transmitted to the mobile devices 13 or the start of the gameplay.

Figure 3:
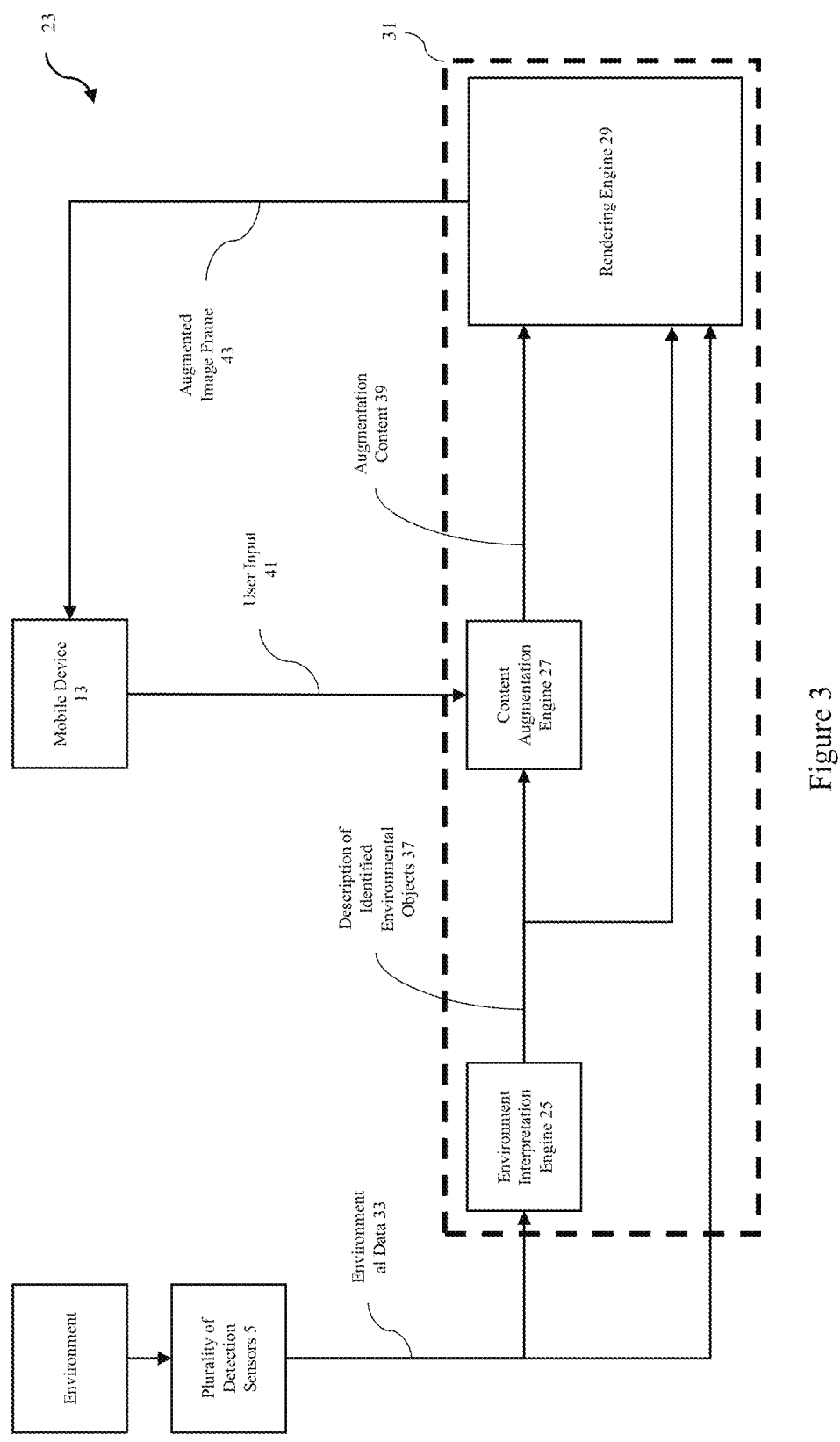
FIG. 3 shows a system in accordance with one or more embodiments disclosed herein.
Figure 5:
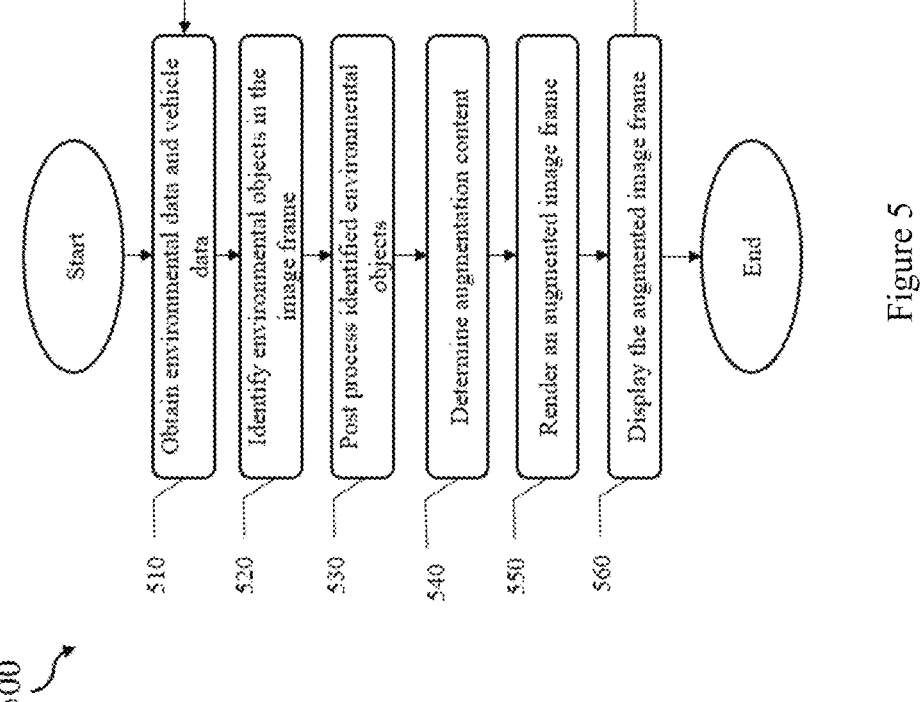
FIG. 5 shows a flowchart of a method in accordance with one or more embodiments disclosed herein.

The gameplay is further detailed in FIGS. 3 and 5, which depict a system and a method for mixed-reality in automotive applications, respectively, in accordance with one or more embodiments.

The ECU 17 of the vehicle 1 may be formed of one or more processors, microprocessors, Integrated Circuits (IC) or equivalent computing structures. Accordingly, the vehicle data and the environmental data recorded by the plurality of vehicle sensors 3 and the plurality of detection sensors 5, respectively, may be transmitted (i.e., via the bus 11 or wirelessly) to the ECU 17 and processed by the ECU 17 prior to the vehicle data and the environmental data being transmitted to the server 15.

In one or more embodiments, the server 15 may include a cloud-based instance of a developer kit (not shown). In addition, the ECU 17 or the plurality of mobile devices 13 may include an in-car instance (not shown) of the developer kit. The developer kit facilitates the development of mixed-reality applications and may include tools for processing the series of image frames, other environmental data, and/or the vehicle data obtained in either raw or pre-processed form. In one or more embodiments, the developer kit provides creation tools for creating virtual objects (e.g., FIG. 6) and/or a physics engine. The developer kit may further provide a developer interface (not shown) for developers and/or users to access the series of image frames and/or other environmental data and vehicle data for further use (e.g., by a game engine) in order to create a virtual scene of the external environment of the vehicle 1 within a mixed-reality environment (e.g., FIG. 4B). Developer interfaces may be provided in the form of one or more Application Programming Interfaces (APIs) (not shown). APIs may exist, for example, to provide access to vehicle data and environmental data (e.g., the series of image frames, LIDAR data, etc.) obtained from the plurality of vehicle sensors 3 and the plurality of detection sensors 5. APIs may further exist for a 3D development space, and for the rendering of a 2.5D output as further discussed in reference to FIGS. 6 and 7. The APIs may provide access to any of the functionalities as subsequently described.

The developer interface may be standardized for straightforward access to the vehicle data and environmental data for a wide variety of applications using the vehicle data and environmental data. As described below in FIG. 5, the developer interface may provide access not only to the vehicle data and environmental data obtained from the plurality of vehicle sensors 3 and the plurality of detection sensors 5, respectively, but also to data that is a result of machine learning-based processing of the vehicle data and environmental data. The developer kit may allow a third party (e.g., an application developer) to provide content for execution on the system as further described in reference to FIG. 3.

The cloud-based interface is the component of the development kit that may be accessible by an application developer for testing and deployment of an application. The in-car instance is the component of the development kit that executes locally through the ECU 17 or on a plurality of mobile devices 13. The in-car instance may gather user input commands, perform operations associated with the visualization of the content to be displayed to a user, and/or execute the application.

Alternatively, in one or more embodiments, and as depicted in FIG. 2, the ECU 17 of the vehicle 1 may include the processing unit 7. Specifically, the ECU 17 may include an in-car computer (not shown) of the development kit and the plurality of mobile devices 13 may include an end-user interface (not shown) of the development kit. The in-car computer and the end-user interface may be functionally equivalent to the cloud-based interface and the in-car instance, respectively, although in a local implementation without cloud processing. Periodic communication with other remote computing devices (e.g., cloud-based components) may be limited to, for example, downloading of an application, servicing of an application, etc.

FIG. 3 is a block diagram of a system 23 for mixed-reality in automotive applications, in accordance with one or more embodiments. In one or more embodiments, the system 23 is associated with a vehicle 1. For example, one or more elements of the system 23 may be components of the vehicle 1, the system 23 may be used by a user of the vehicle 1 (e.g., a passenger and/or a driver), etc. Specific scenarios are described below.

The system 23 includes a plurality of detection sensors 5, a plurality of vehicle sensors 3, a processing unit 7, and a plurality of mobile devices 13. In one or more embodiments, the processing unit 7 includes an environment interpretation engine 25, a content augmentation engine 27, and a rendering engine 29. Alternatively, in one or more embodiments the plurality of mobile devices 13 include the content augmentation engine 27 and/or the rendering engine 29. The environment interpretation engine 25, the content augmentation engine 27, and the rendering engine 29 may be elements of a machine learning model 31. Each of these components is subsequently described.

The plurality of detection sensors 5 are employed to capture environmental data 33 associated with the external environment of the vehicle 1. In particular, a plurality of visual sensors 35 of the plurality of detection sensors 5 may capture a plurality of respective video feeds that each capture a portion of the external environment. Each video feed may be formed of a series of image frames of the external environment. Image frames may be captured repeatedly at a fixed or adjustable frame rate. The plurality of visual sensors 35 may be of any type and have any field of view, resolution, orientation, etc. In one embodiment, a fisheye camera is used, however other sensors such as an infrared camera, pinhole camera, LIDAR and radar sensors, or equivalent sensors may be employed. Environmental data 33 from the plurality of visual sensors 35 (e.g., image frames) may be provided in any format (e.g., representing RGB pixel values) and may be received by the ECU 17 of the vehicle 1. The ECU 17 may include components for a hardware-accelerated video processing, including machine learning-based video processing. The ECU 17 may further execute various components of the system 23 (e.g., the environment interpretation engine 25, the content augmentation engine 27, and/or the rendering engine 29).

In addition, the vehicle data recorded by the plurality of vehicle sensors 3 may be provided in any form and may depend on the type of sensor. For example, a steering angle sensor may provide a value reflecting a measurement of the steering angle.

In one or more embodiments, the environmental data 33 and/or vehicle data may be preprocessed, as further described below in reference to the flowchart.

The environment interpretation engine 25, in one or more embodiments, receives the environmental data 33 (e.g., a series of image frames) and identifies environmental objects 37 in each image frame. For example, the roadway, pedestrians, additional vehicles, buildings, the sky, etc., may be identified from the video feed of a visual sensor 35. The environment interpretation engine 25 may perform methods of image processing in order to identify the environmental objects 37. Any type of image processing may be used, including the use of machine learning-based algorithms.

Machine learning, broadly defined, is the extraction of patterns and insights from data. The phrases "artificial intelligence", "machine learning", "deep learning", and "pattern recognition" are often convoluted, interchanged, and used synonymously with the phrase "Machine Learning". For consistency, the term machine learning, or machine-learning, will be adopted herein. However, one skilled in the art will recognize that the concepts and methods detailed hereafter are not limited by this choice of nomenclature.

Machine learning model 31 types as used herein for video processing, and for processing image frames may include, but are not limited to: generalized linear models, Bayesian regression, random forests, and deep learning models such as neural networks, convolutional neural networks, and recurrent neural networks. Machine learning models 31, whether they are considered deep learning or not, are usually associated with additional "hyperparameters" which further describe the model. For example, hyperparameters providing further detail about a neural network may include, but are not limited to, the number of layers in the neural network, a choice of activation functions, the inclusion of batch normalization layers, and regularization strength. It is noted that in the context of machine learning, the regularization of a machine learning model 31 refers to a penalty applied to the loss function of the machine learning model 31, and may, for example, be input into the machine learning model 31 with a back propagation process. Commonly, the selection of hyperparameters surrounding a machine learning model 31 is referred to as selecting the model "architecture". Once a machine learning model type and hyperparameters have been selected, the machine learning model 31 is trained to perform a task. As described herein, training a machine learning model 31 comprises feeding the machine learning model 31 various "test" data image sets and providing the machine learning model 31 with affirmation based upon the model correctly identity of an object in the test data image set. In accordance with one or more embodiments, a machine learning model type and associated architecture are selected by a manufacturer of the vehicle 1, the machine learning model 31 is trained to perform video-processing to determine environmental image data, the performance of the machine learning model 31 is evaluated, and the machine learning model 31 is used in a production setting (also known as deployment of the machine learning model 31).

The operations performed by the environment interpretation engine 25 are described below in reference to the flowchart. The environment interpretation engine 25 may be executed within the server 15 or the ECU 17 of the vehicle 1 by the machine learning model 31.

The content augmentation engine 27, in one or more embodiments, receives the identified environmental objects 37 and determines an augmentation content 39, based on the environmental objects 37.

In one or more embodiments, augmentation content 39 includes any modification of an image frame, for subsequent displaying to a user. For example, augmentation content 39 may include a blurring, marking, highlighting, distorting, removing, moving, recoloring, animating, or any other modification of one or more of the identified environmental objects 37. Augmentation content 39 may further include the addition of any number of objects. An added object may be a static or a dynamic object. A static object may be an indicator (e.g., an arrow pointing at another object, an icon representing an object, etc.), whereas a dynamic object may be an object that changes its characteristics (e.g., shape, size, color, location, etc.) over time (e.g., frame-by-frame). Such dynamic objects may include, for example, animated characters or an avatar (e.g., FIG. 4B).

In one or more embodiments, the augmentation content 39 may be user-controllable, either directly or indirectly. A mobile device 13 may enable a user to provide input device commands as user input 41. For example, a user may provide steering commands via a mobile device 13 to control the position, orientation, movement, etc., of an object that is an element of the augmentation content 39. The control of augmentation content 39 may be context-specific, may enable interaction within the augmentation content 39, etc. The mobile device 13 allowing control over the augmentation content 39 may be a smartphone, a tablet, a mobile gaming device, or a similar device that enables a user to provide input. The mobile device 13 may communicatively interface with the computing device(s) (e.g., an ECU 17) of the vehicle 1 or directly with a server 15. A more detailed discussion of different types of augmentation content 39 and possible interactions with the augmentation content 39 by one or more users is provided below in the discussion of various examples of possible applications.

The rendering engine 29, in one or more embodiments, receives the environmental data 33 or series of image frames and the augmentation content 39 and generates a series of augmented image frames 43. In preparation for displaying the augmented image frames 43, the rendering engine 29 may perform an occlusion detection to render only pixels that are supposed to be visible. For example, when augmentation content 39 is present, the rendering engine 29 may generate an object mask which is then used to identify occlusion and render only desired pixels of the environmental data 33 or image frame. In one or more embodiments, machine learning data is used to generate the object mask which in turn is used to identify occlusion and render only the desired pixels. A rendering engine 29 such as Unity or Unreal may be used.

A mobile device 13 is used to display the series of augmented image frames 43 to the user. In one or more embodiments, the infotainment module 9 may be employed to display the series of augmented image frames 43 to the user in conjunction with or instead of the plurality of mobile devices 13.

The system 23 enables various implementations of mixed-reality experiences. In one or more embodiments, a 3D gameplay may be established based on the environmental data 33 captured by the plurality of detection sensors 5 associated with the external environment of the vehicle 1. In this case, the mixed-reality environment of the gameplay is generated in real-time based on the actual external environment surrounding the vehicle 1. In one specific example, a forward-facing visual sensor 35 of the vehicle 1 may be used to capture a video feed (i.e., a series of image frames). Subsequently, the video feed may be displayed to the user, along with various augmentations. The user may control an avatar in this environment by user input 41 through a mobile device 13. The gameplay may include obstacles to be avoided (e.g., certain environmental objects 37 or virtual objects added as augmentation content 39). The gameplay may also include targets (e.g., virtual objects added as augmentation content 39) that reward or penalize a user of the system 23 based upon the identity of the object.

While the gameplay is a mixed-reality application, a corresponding virtual-reality implementation may be provided by fully replacing all identified environmental objects 37 with augmentation content 39. For example, the identified roadway may be rendered as an artificial roadway, the identified additional vehicles may be rendered as additional vehicles in a different form, etc. In this configuration, the video feed itself may be excluded from the series of augmented image frames 43 provided as output to the user. The described gameplay may be operating in real-time (based on image frames that are processed in real-time, or in non-real-time (relying on previously recorded image frames).

A system 23 in accordance with embodiments of the disclosure may support a plurality of varying gameplays that differ in the objective, style, level of mixed-reality, etc. A user may select a desired gameplay from a set of available gameplay applications stored in a memory of the processing unit 7, or a gameplay may be specified by a third party. For example, a parent may select a particular gameplay application for a child that has age-appropriate augmentation content 39 embedded therein.

While FIGS. 1-3 show configurations of components, other configurations may be used without departing from the scope of the disclosure. For example, various components may be combined to create a single component. In addition, the functionality performed by a single component may be performed by two or more components. Various operations performed by the system 23 may be performed on a computing system such as the ECU 17 of the vehicle 1. At least some of these operations (e.g., environment interpretation, rendering, etc.) may benefit from the availability of a graphics processing unit (GPU) (not shown) and may be performed thereby. Accordingly, the ECU 17 or another computing system may be equipped with a GPU. Further, while not explicitly shown, the operations performed by the various components discussed in reference to FIGS. 1 and 2 may be performed locally or remotely (e.g., in the server 15).

Figures 4A, 4B:
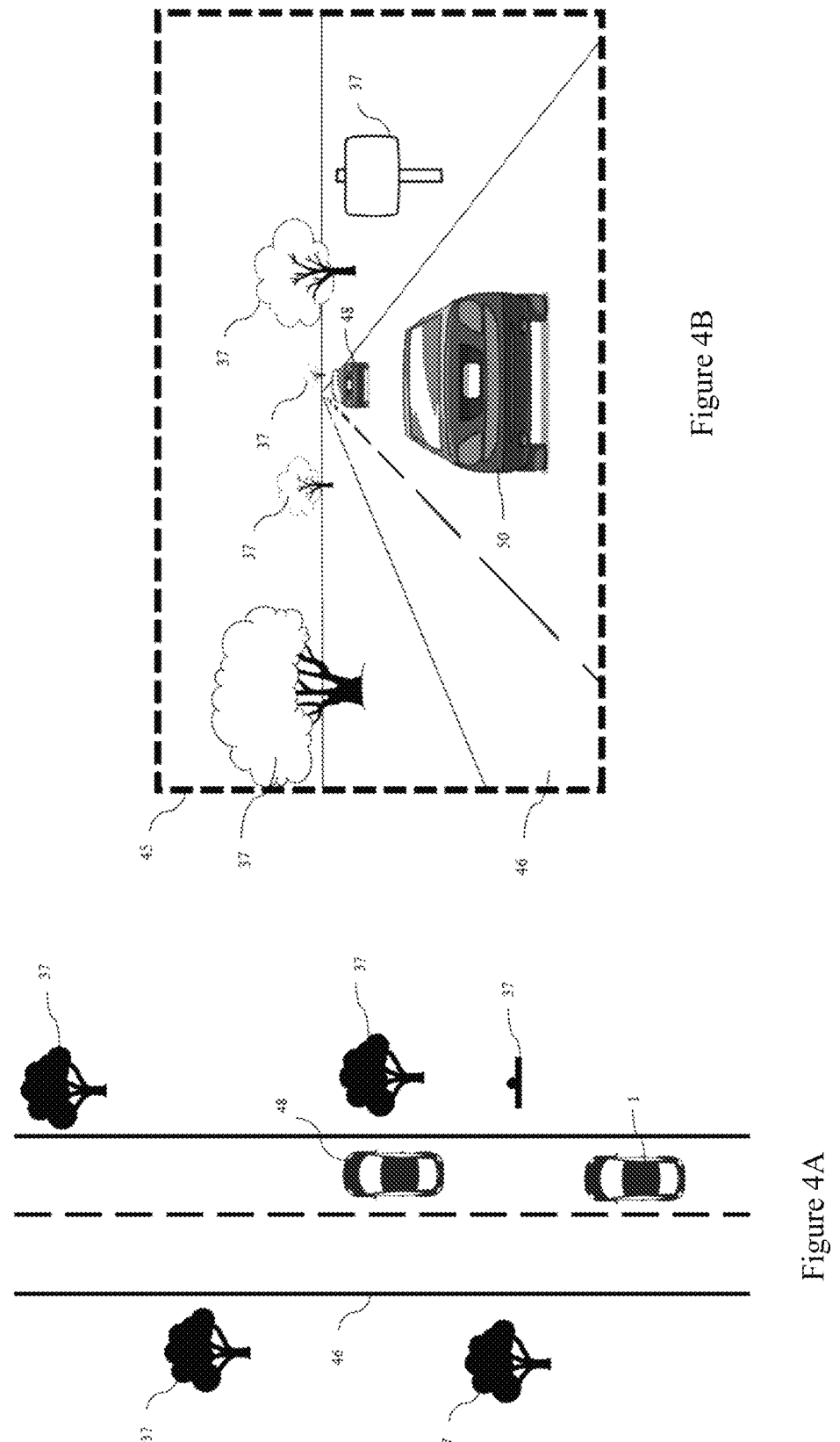
FIGS. 4A and 4B show a visualization of a process in accordance with one or more embodiments disclosed herein.

FIGS. 4A and 4B depict a visualization of a process for generating a mixed-reality environment 45 for automotive applications in accordance with one or more embodiments. Specifically, in FIG. 4A, a vehicle 1 is traveling on a roadway 46. In this non-limiting example, the vehicle 1 is traveling behind an additional vehicle 48 on the roadway 46, and several environmental objects 37 (i.e., a road sign and trees) are located along the outer edge of the roadway 46. While the vehicle 1 is traveling along the roadway 46, the plurality of detection sensors 5 capture environmental data 33 and the plurality of vehicle sensors 3 record vehicle data. Simultaneously, while capturing environmental data 33, the environmental data 33 is processed by the processing unit 7 to identify the environmental objects 37 as explained above in the description of FIGS. 1-3. Accordingly, the processing unit 7 identifies the road sign and the trees captured by the plurality of detection sensors 5 as environmental objects 37.

FIG. 4B depicts an exemplary mixed-reality environment 45 associated with the environmental data 33 recorded by the vehicle 1 in FIG. 4A. In a mixed-reality environment 45, elements and visuals may come from a live or a recorded video feed, and some of the elements are virtual and superimposed on the video feed. In FIG. 4B, the mixed-reality environment 45 is an augmented image frame 43 employing an image frame captured by a visual sensor 35 of the plurality of the detection sensors 5 of the vehicle 1. The augmented image frame 43 includes a visualization of the external environment of the vehicle 1 from the perspective of the visual sensor 35. That is, the mixed-reality environment 45 includes the roadway 46, the additional vehicle 48, the road sign, and the trees that were captured by the plurality of detection sensors 5 in FIG. 4A.

In addition, the mixed-reality environment 45 of FIG. 4B includes a virtual object. Here, the virtual object is an avatar 50 represented as a car. An avatar 50 is a virtual object and element of a gameplay that may be controlled by user input 41 and vehicle data. Further, an avatar 50 may be represented as any virtual object (e.g., a motor vehicle, an airplane, a human, an animal, etc.).

In one or more embodiments, the environmental data 33 captured by the plurality of detection sensors 5 may be processed using the techniques discussed previously in FIG. 3 to provide target identification and tracking (e.g., of additional vehicles 48 and other environmental objects 37), lane identification and tracking, depth maps, semantic segmentation, weather conditions, sun position, ambient brightness levels, and other information that might be relevant to the gameplay.

In one or more embodiments, the processing unit 7 may detect the position of the Sun relative to the vehicle 1 from the environmental data 33 at the time a video feed is captured. To this end, a virtual object representing a virtual light source may be included in the mixed-reality environment 45 of the gameplay. The virtual light source may be positioned in the mixed-reality environment 45 relative to the location of the Sun in the external environment as captured by the video feed. Consequently, virtual objects and/or environmental objects 37 may include illumination, reflections, and virtual shadows to match the lighting in the external environment.

Further, in one or more embodiments, the processing unit 7 may receive or determine the weather conditions of the external environment of the vehicle 1 from the environmental data 33 captured by the plurality of detection sensors 5. For example, the processing unit 7 may determine the presence of a form of precipitation during processing of the video feed. In addition, the plurality of detection sensors 5 may include an external thermometer or a sun sensor 52 (e.g., FIG. 2) to acquire weather conditions of the external environment. The sun sensor 52 may be disposed within the interior of the vehicle 1 and detect the amount of light received within the vehicle 1 and/or the ambient brightness level. Accordingly, this information may be used to modify the level of brightness of the mixed-reality environment 45 of the gameplay or the level brightness of a display screen (e.g., FIG. 9) of a mobile device 13. In one or more embodiments, the processing unit 7 may adjust the mixed-reality environment 45 based on weather conditions received from an external server or by user input 41.

FIG. 5 shows a flowchart 500 of a method for generating a mixed-reality environment 45 for automotive applications, in accordance with one or more embodiments. Execution of one or more steps in FIG. 5 may involve one or more components of the system 23 as described in FIGS. 1-4. While the various steps in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The operations implementing the described steps may be represented by electronically-readable instructions, such as software code, firmware code, etc., which may be stored on one more non-transitory media.

In Step 510, environmental data 33 and vehicle data are obtained. In one or more embodiments, the environmental data 33 includes a series of image frames obtained by a plurality of detection sensors 5 as previously described. In one or more embodiments, the plurality of detection sensors 5 includes a fisheye camera. Step 510 may involve a pre-processing that is specific to one or more sensors of plurality of detection sensors 5. For example, a series of image frames obtained from a visual sensor 35 may be pre-processed to eliminate distortions, such as distortions typical for fisheye cameras. That is, a cropping of each image frame may be performed to obtain a series of rectangular image frames of the content of interest. Any other preprocessing such as brightness, contrast correction, compression, resizing, etc. may be performed.

In one or more embodiments, the series of image frames may be projected in forms (e.g., standard projection, cylindrical projection, etc.) determined by the user or application. In addition, image frames from various visual sensors 35 may be merged in order to project a larger view of the external environment of the vehicle 1. Accordingly, the merged image frames may be projected such that the mixed-reality environment 45 may be viewed from several varying angles or perspectives as discussed further in FIG. 10.

In Step 520, environmental objects 37 are identified in the series of image frames. A series of image frames may be analyzed, for example, in order to detect motion. In one or more embodiments, AI-based image processing is used for the identification of the environmental objects 37. For example, deep learning-based image processing such as OmniDet, Single-Shot Deep MANTA, Single Shot Detection (SSD), Region-based Convolutional Neural Network (R-CNN), You Only Look Once (YOLO) Single Shot Detection, Fast R-CNN, Histogram of Oriented Gradients (HOG), etc. may be used.

The resulting output of the deep learning-based image processing may include a depth estimation utilizing environmental data 33 captured by a stereoscopic or mono camera, a radar unit, a LIDAR unit, an ultrasonic sensor, etc. of the plurality of detection sensors 5. Further, resulting output of the deep learning-based image processing may include a semantic segmentation, visual odometry, motion segmentation, and/or object detection of the environmental objects 37. For example, machine learning data from the image processing may be used to mark different segments in the image. This information may then be used to generate a navigation path for characters in scene. The output may be stored and/or forwarded as a description of the identified environmental objects 37. The description of the identified environmental objects 37 may be linked to a frame number of the corresponding image frame for synchronization purposes. Additional detections may be performed (e.g., a detection of lens soiling). Examples of environmental objects 37 that may be identified include, but are not limited to, roadways 46, lane marks, curbs, pedestrians, additional vehicles 48, passengers, plants, and traffic signs.

In one or more embodiments, environmental data 33 from the plurality of detection sensors 5 may be used to improve the accuracy of the detections, the depth estimates, and/or the semantic segmentations, whereas vehicle data from the plurality of vehicle sensors 3 may be used to determine an accurate estimate of the current position and/or orientation of the vehicle 1.

In Step 530, a post-processing of the identified environmental objects 37 is performed. The post-processing may be performed in order to obtain data associated with the environmental objects 37 in a format suitable for input to a rendering engine 29 (e.g., as described in Step 550). The rendering engine 29 may expect a description of the environmental objects 37 as boundaries of these environmental objects 37. In contrast, the output of the operations of Step 520 may be pixel data. In Step 530, the necessary data manipulations are performed, in order to obtain boundaries. The post processing may be performed for any of the identified environmental objects 37.

The completion of Steps 520 and 530 results in a scene understanding with environmental objects 37 having been identified based on the performed object detection and classification, and further a depth map being available for the environmental objects 37, ensuring that their position, orientation, movement, etc. is known. This includes the identification of planes (e.g., horizontal planes established based on a surface of the roadway 46, vertical planes established based on detected walls or other structures, etc.). The resulting scene understanding may govern possible movement in the mixed-reality environment 45 to be rendered as described below.

In Step 540 augmentation content 39 is determined. Augmentation content 39 to be added to the mixed-reality environment 45 to be rendered depends on the intended gameplay of the mixed-reality environment 45. Augmentation content 39 includes objects to be added, modification of content in the image frame by masking, etc. Objects to be added include, for example, one or more avatars 50, objects, symbols, labels, features, animated characters, text, etc. Each object may be static or dynamic. A dynamic object may be user controlled or may be controlled by the content augmentation engine 27 (e.g., in the case of a computer-controlled character (such as an adversary) moving in the mixed-reality environment 45). Further, objects may change their behavior based on context, contact, etc. Masks for modifying content in the image frame include overlays (e.g., color filters, blurring filters, etc.), either non-transparent or partially transparent that may be static or dynamic (e.g., changing characteristics such color, contrast, flashing on/off, etc.). In one or more embodiments, the augmentation content 39 is linked to a frame number of the corresponding image frame for synchronization purposes.

Objects may be placed under consideration of the previously identified planes. For example, a horizontal plane may serve as a drivable area for an avatar 50 representing a car, whereas a vertical plane may serve as a boundary. Character scaling and path planning may further be performed in order to generate navigation paths for characters/avatars 50. A* or any other path planning algorithm may be used, for example.

In Step 550, a series of augmented image frames 43 are rendered based on the series of image frames and the augmentation content 39. In one or more embodiments, the rendering may be performed based on input including each image frame itself, the identified environmental objects 37, and the augmentation content 39. A description of the identified environmental objects 37 may include a geometry. The geometry may be in the form of boundary pixels of each of the previously segmented objects (e.g., the ground, a pedestrian, an additional vehicle 48, etc.). Depth information may be included in the description. Similarly, a description of the augmentation content 39 includes a geometry of the augmentation content 39. Input that may affect the rendering may further be received from a user. For example, the user may change the view to be rendered by a control command, by steering control movements, etc.

The rendering takes these inputs and generates pixel position points that can subsequently be used for mapping on a 2D scene to be displayed. In one or more embodiments, the rendering takes into consideration the geometry of the objects (i.e., the environmental objects 37 and the augmentation content 39) to determine occlusion. Based on detected occlusions, an invisible mask based on the outline of the occluding geometry is determined, and the rendering is then performed only for the portion that is not occluded, based on the mask.

In one or more embodiments, the rendering ensures synchronization between the image frames, the description of the identified environmental objects 37, and the augmentation content 39. The synchronization may be performed based on frame numbers.

In Step 560, the series of augmented image frames 43 are displayed on a mobile device 13 and/or the infotainment module 9 of the vehicle 1. If the rendering is performed for multiple users, the augmented image frames 43 may be displayed on multiple mobile devices 13. Furthermore, steps 510-560 may be performed in a loop, and the loop may be based on a fixed frame rate. This frame rate may correspond to the frame rate of the detection sensors 5, or it may be different.

Figure 6:
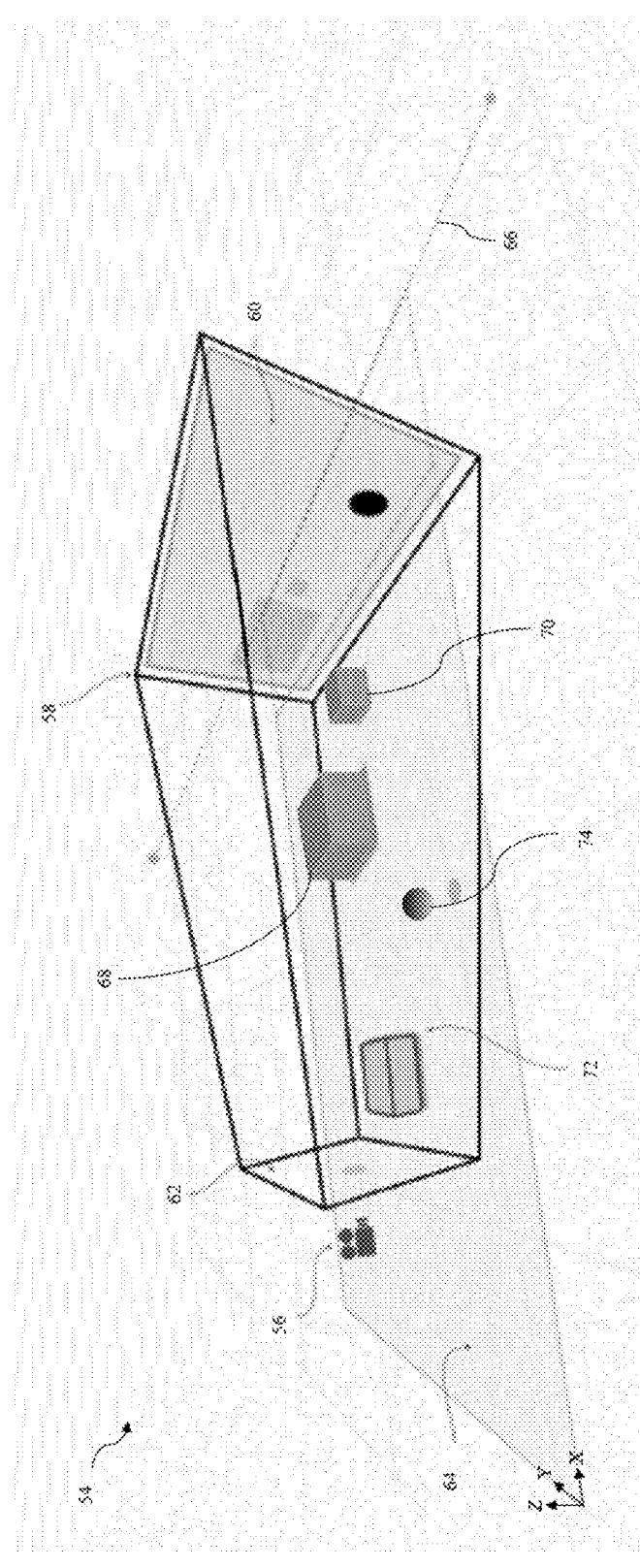
FIG. 6 shows a system in accordance with one or more embodiments disclosed herein.
Figure 7:
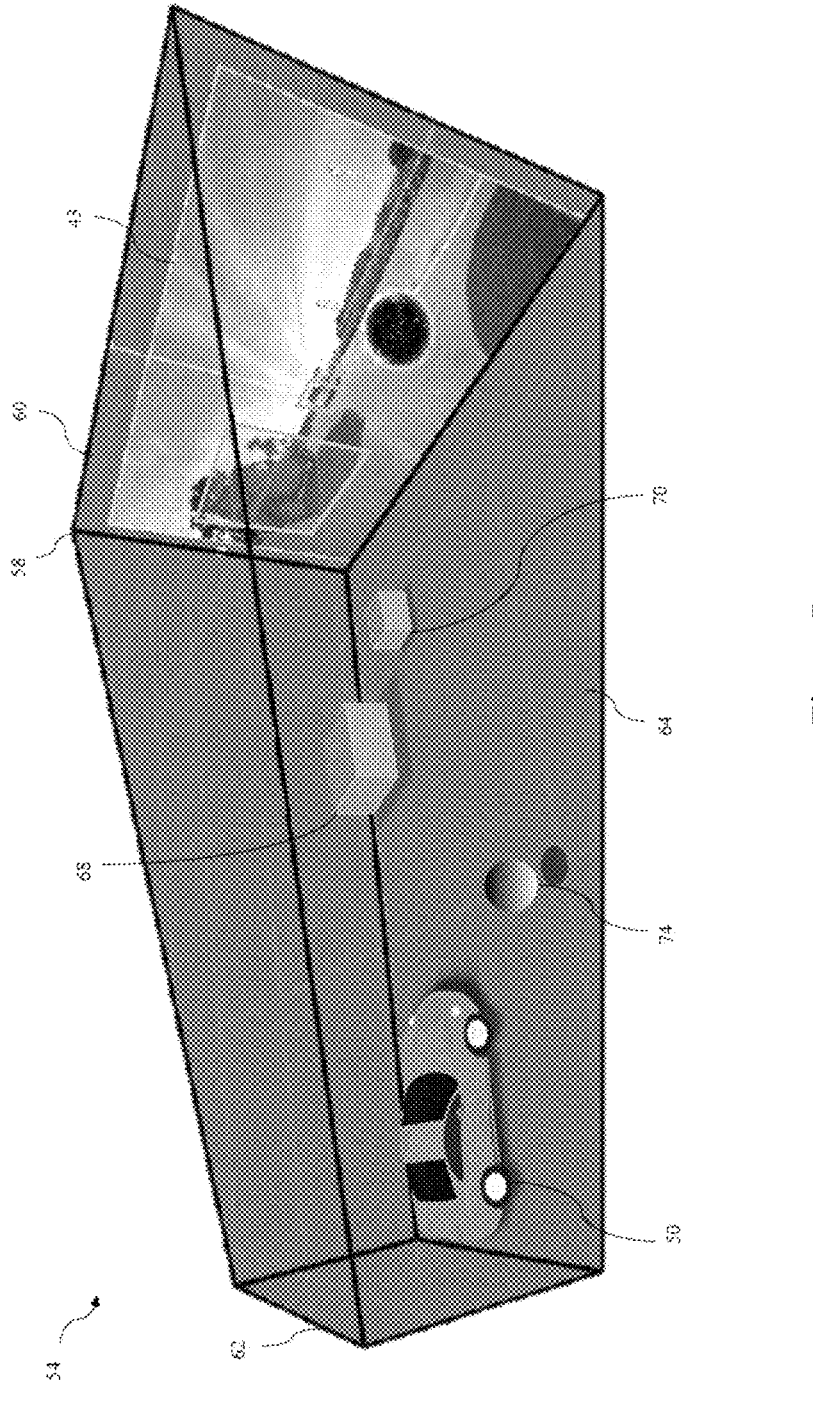
FIG. 7 shows a system in accordance with one or more embodiments disclosed herein.

FIGS. 6 and 7 depict a game-centric coordinate system 54 that is employed to produce the mixed-reality environment 45 of the gameplay in accordance with one or more embodiments. The game-centric coordinate system 54 may be produced as a part of a rendering of a 2.5D output during Step 550 of the flowchart 500 of FIG. 5. Specifically, the environmental data 33 collected by the plurality of detection sensors 5 and processed by the techniques discussed above in FIG. 3 is converted to the mixed-reality environment 45 based on the game-centric coordinate system 54 of the gameplay of the system 23. In FIG. 6, the game-centric coordinate system 54 includes a virtual camera 56 and a frustum 58 defined by a plurality of projection planes. In addition, the game-centric coordinate system 54 includes the shapes, sizes, and locations of environmental objects 37 and virtual objects in a 3D space.

The frustum of the game-centric coordinate system 54 is defined by an intersection of a far plane 60 and a ground plane at a first end and an intersection of the ground plane and a near plane 62 at a second, opposite end. Any virtual objects contained within these bounds are drawn as an overlay on a projected image frame. Any virtual objects outside of these bounds would not be included in the mixed-reality environment 45 of the gameplay.

An image frame is projected on the far plane 60 of the game-centric coordinate system 54. In this way, the far plane 60 of the game-centric coordinate system 54 embodies the frustum 58 of a cone of view of a virtual camera 56 in the scene. Based on parameters of the image frame (e.g., horizontal and vertical fields of view) the virtual camera 56 is placed in the scene at a virtual distance from the far plane 60. As such, the virtual camera 56 may capture a desired view of the image frame. That is, the virtual camera 56 may view the image frame being projected on the far plane 60 in a way that is similar to the view of the external environment from a specified detection sensor 5.

The ground plane of the game-centric coordinate system 54 is also known as the "gameboard" 64 of the mixed-reality environment 45 of the gameplay. A first end of the ground plane essentially contacts the far plane 60 at a horizon 66 on the image frame. The horizon 66 on the image frame is based on the location and lens parameters of the detection sensor 5 associated with the image frame. The ground plane is perpendicular to the far plane 60 but may be tilted up or down based on an inclination of the roadway 46 the vehicle 1 is located upon. A second end of the ground plane, opposite of the first end, is placed a distance below the virtual camera 56 based on the height, camera tilt, etc. of the visual sensor 35 associated with the image frame. Consequently, the ground plane, when viewed from the virtual camera 56, matches the perspective that is captured by the detection sensor 5 associated with the image frame. In this way, virtual objects placed along the gameboard 64 of the mixed-reality environment 45 for the gameplay will appear as if they are on the ground of the external environment when projected in front of the image frame on the far plane 60. In addition, each virtual object added along the gameboard 64 may include a shadow. Shadows cast onto the ground plane will generally appear as if they are cast correctly on the ground when merged with the image frame through the perspective of the virtual camera 56.

The near plane 62 of the game-centric coordinate system 54 represents the position the visual sensor 35 associated with the image frame is located along the length of the vehicle 1. Any virtual objects placed outside the frustum 58 behind the near plane 62 are hidden from the field of view of the virtual camera 56 because they would not have been visible from the visual sensor 35 that produced the image frame that is being projected on the far plane 60.

Scaling of the 3D gameboard 64 and mixed-reality environment 45 is also dependent on the visual sensor 35 associated with the image frame (e.g., position, lens parameters, etc.). Factors of the scaling are computed based on the environmental data 33 received by the machine learning model 31 for the specific visual sensor 35 associated with the image frame being utilized in the mixed-reality environment 45.

As mentioned in the description of flowchart 500 of FIG. 5, the machine learning model 31 identifies environmental objects 37 within an image frame. Upon identifying the environmental objects 37, a 2D or 3D bounding polygon and a location relative to the vehicle 1 is created within the game-centric coordinate system 54. These bounding polygons are placed into the scene to represent on the gameboard 64 the position of the associated environmental objects 37 relative to the vehicle 1 in 3D space. In particular, the location of the bounding polygons on the gameboard 64 is determined by a depth estimation of each environmental object 37.

In FIG. 6, a first 3D bounding polygon 68 and a second 3D bounding polygon 70 are depicted along the gameboard 64 representing a first environmental object and a second environmental object, respectively, identified from the image frame captured with the aforementioned detection sensor 5. The first bounding polygon 68 is disposed along the gameboard 64 closer to the near plane 62 than the second bounding polygon 70, thereby indicating that the first environmental object is closer to the vehicle 1 in the external environment than the second environmental object.

In addition, the machine learning model 31 may place virtual objects within the game-centric coordinate system 54 for purposes of the selected gameplay. In FIG. 6, a first virtual object 72 is included in the game-centric coordinate system 54 that represents an avatar 50. An avatar 50 may be any virtual object and is controlled by user input 41 and from the vehicle data. In addition, in FIG. 6, a second virtual object 74 representing an obstacle of a gameplay is included and placed at a location on the gameboard 64.

Since the second virtual object 74 is not positioned between a bounding polygon and the far plane 60, the second virtual object 74 is projected onto the current image frame to be seen on the display. In the instance that a virtual object is placed or moves between one of the bounding polygons of the identified environmental objects 37 and the far plane 60, the machine learning model 31 may turn the virtual object transparent or may remove the virtual object in order to avoid the virtual object being placed in the same position as the environmental object 37 in the outputted image frame.

Movements of the virtual objects within the game-centric coordinate system 54 are associated with the movements of the vehicle 1 within the external environment. Specifically, virtual objects move within the game-centric coordinate system 54 based on the vehicle data of the vehicle 1. For example, in FIG. 6, the movement of the first virtual object 72, an avatar 50 that is controlled by the vehicle data, along an X-direction is stationary within the game-centric coordinate system 54 since the first virtual object 72 is moving at the same speed as the vehicle 1 capturing the image frames. However, if the second virtual object 74 is designed to appear as static on the gameboard 64, then the second virtual object 74 must move towards the near plane 62 and virtual camera 56 in the game-centric coordinate system 54 at the same speed that the vehicle 1 is moving in the external environment as depicted in the image frames.

In another example, the second virtual object 74 may move through the mixed-reality environment 45 of a gameplay at roughly the same speed as the first virtual object 72. If the second virtual object 74 is to increase speed relative to the first virtual object 72, then the second virtual object 74 moves along the X-axis of the game-centric coordinate system 54 in a direction towards the far plane 60 on the gameboard 64. If the second virtual object 74 is to decrease speed relative to the first virtual object 72, then the second virtual object 74 moves along the X-axis of the game-centric coordinate system 54 in a direction towards the near plane 62 on the gameboard 64.

In one or more embodiments, virtual objects may perform lateral movements along the Y-axis of the game-centric coordinate system 54. Lateral movements shift the position of the virtual objects left and right on the gameboard 64 with respect to the image frame. However, the virtual objects may appear to continue moving forward due to the projected image frames showing forward movement.

In one or more embodiments, the lateral movements of the virtual objects may be limited. Specifically, the virtual objects may be bound by side planes (not shown). These side planes may be vertical sides of the frustum 58 that extend between the near plane 62 and the far plane 60. In the event that a virtual object moves laterally enough along the gameboard 64 in the game-centric coordinate system 54 to reach a side plane, the virtual object is prevented from moving further in that lateral direction. Alternatively, the virtual objects may be bound by the width of the detected roadway 46 that is projected on the gameboard 64. Therefore, if a first virtual object 72 is closer to the near plane 62 than a second virtual object 74, the first virtual object 72 may travel a greater lateral distance within the game-centric coordinate system 54 than the second virtual object 74 due to the perspective of the roadway 46 causing the roadway 46 to reduce in width as the roadway 46 extends towards a vanishing point at the horizon 66.

In one or more embodiments, the virtual objects may be able to move along the Z-axis within the game-centric coordinate system 54. That is, the virtual objects may be able to lift up off the gameboard 64. For example, a virtual object may be able to jump in order to avoid collision with an additional virtual object or environmental object 37. The movement of the virtual objects in the Z-direction may be bound by the gameboard 64, or ground plane, and a horizontal top plane (not shown) of the frustum 58 that extends between the near plane 62 and the far plane 60.

In FIG. 7, the game-centric coordinate system 54 includes an exemplary image frame projected against the far plane 60. Here, the image frame is of an external environment of a vehicle 1 collected by a visual sensor 35 of the vehicle 1. Similar to FIG. 6, the game-centric coordinate system 54 includes a first 3D bounding polygon 68 and a second 3D bounding polygon 70 representing a first environmental object and a second environmental object, respectively, identified from the image frame projected against the far plane 60. In this case, the first bounding polygon 68 and the second bounding polygon 70 represent additional vehicles 48 along the same roadway 46 as the vehicle 1. Accordingly, the gameboard 64 of the game-centric coordinate system 54 represents this roadway 46 of the image frame. In addition, the avatar 50 in this example of FIG. 7 is represented as a sports car. Further, the second virtual object 74 is superimposed or fused into the image frame of the mixed-reality environment 45 (i.e., creating an augmented image frame 43) by the machine learning model 31 in order for the second virtual object to be viewed by a user of the gameplay.

In a resulting mixed-reality gameplay, detected environmental objects 37 may become elements of the gameplay. For example, the gameplay may require an avatar 50 that is controlled by user input 41 to avoid colliding with environmental objects 37 detected from the image frames and virtual objects introduced by the machine learning model 31. In the case that the user input 41 fails to move the avatar 50 in a direction to avoid an environmental object 37, a collision may occur between the avatar 50 and the environmental object 37. In the event of a collision, the avatar 50 may appear to bounce off the environmental object 37 by imparting the location of the environmental object 37 with a change in speed and direction determined by the machine learning model 31 and, in one or more embodiments, uncontrollable by user input 41. Alternatively, the avatar 50 may be visually depicted as exploding based upon its contact with the environmental objects 37. Similarly, in the event that a virtual object not under the control of user input 41 interacts with the location of an environmental object 37, the virtual object may impart the location of the environmental object 37 with a change in speed and direction, travel through the environmental object 37, or be removed from the mixed-reality environment 45 entirely. In the event that an avatar 50 interacts with the location of a different virtual object, the avatar 50 and/or the virtual object may impart the other with a change in speed and direction, travel through the other, or be removed from the mixed-reality environment 45. Alternatively, depending on the gameplay, the gameplay may end if an avatar 50 collides with an environmental object 37 or a different virtual object.

Figure 8:
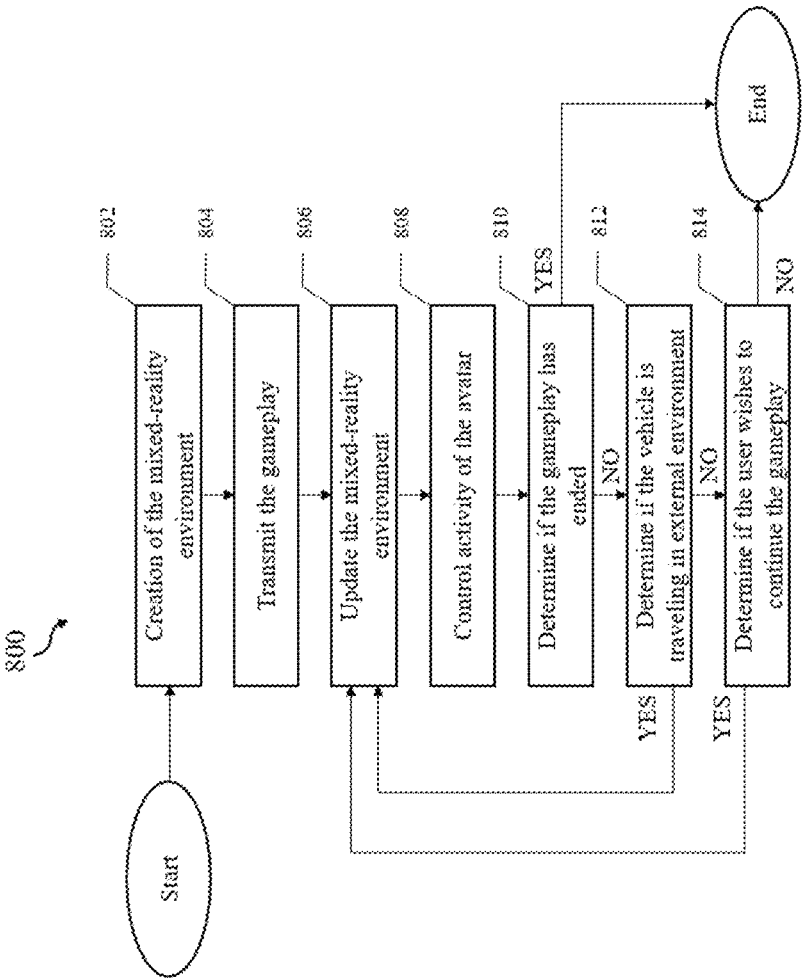
FIG. 8 shows a flowchart of a method in accordance with one or more embodiments disclosed herein.

FIG. 8 shows a flowchart 800 of a method of modifying a mixed-reality environment 45 of a gameplay based on a plurality of conditions, in accordance with one or more embodiments.

In Step 802, the processing unit 7 of the system 23 creates a mixed-reality environment 45 for a gameplay based on environmental data 33 obtained from a plurality of detection sensors 5 of a vehicle 1. The gameplay, selected from a plurality of gameplay applications, is stored in a memory of the processing unit 7.

In Step 804, the processing unit 7 begins the gameplay subsequent to user instructions. As such, the processing unit 7 transmits the gameplay to a plurality of mobile devices 13 in order for the gameplay to be visible upon the display screens of the mobile devices 13.

In Step 806, the processing unit 7 receives the environmental data 33 and vehicle data from the plurality of detection sensors 5 and the plurality of vehicle sensors 3, respectively. Accordingly, the position of environmental objects 37 and their respective bounding polygons are updated within the game-centric coordinate system 54, and thus the mixed-reality environment 45 is also updated in this manner. In addition, the activity (e.g., position, speed, etc.) of the avatar 50 may be updated and controlled based on the latest vehicle data received. In one or more embodiments, the avatar 50 is configured to traverse the mixed-reality environment 45 in a direction at a rate proportional to the vehicle 1.

In addition, upon receiving the most current environmental data 33 from the plurality of detection sensors 5, which may be done in real-time as the vehicle is moving, the processing unit 7 may modify the weather and time of day (e.g., brightness/darkness, position of the Sun/moon, etc.) depicted in the mixed-reality environment 45 of the gameplay. For example, if rain is detected in the external environment of the vehicle 1 by the plurality of detection sensors 5, then the machine learning model 31 may cause rain to occur in the gameplay. Accordingly, the physics of the gameplay may adjust with a change in the weather. For example, when the gameplay includes rainy and/or snowy weather, virtual objects may be imbued with a lower virtualized frictional coefficient such that the virtual objects skid or swerve subsequent to user inputs 41 of acceleration and lateral movements. In addition, the illumination, reflections, and virtual shadows of virtual objects and environmental objects 37 depicted in the gameplay may also be adjusted according to the weather and the time of day.

In Step 808, the processing unit 7 receives user input 41 from the plurality of mobile devices 13. In turn, the processing unit 7 controls the activity of the avatar 50 within the game-centric coordinate system 54, and thus the mixed-reality environment 45, based on the user input 41 received. For example, the user input 41 may be steering commands that control the position, orientation, movement, etc. of an avatar 50. In addition, the user input 41 may adjust one or more settings of the gameplay. For example, the one or more settings that may be adjusted are the perspective of the virtual camera 56 of the mixed-reality environment 45, the weather, the physics of the gameplay (e.g., gravity, acceleration across the gameboard 64 of the game-centric coordinate system 54, etc.), damage allowance or health of the avatar 50, amount/frequency/type of additional virtual objects introduced in the gameplay, etc.

In Step 810, the processing unit 7 determines if the gameplay has ended. That is, the processing unit 7 determines if the gameplay was paused/canceled by user input 41, the end of the gameplay was reached (e.g., by winning/losing a game, by time limit, etc.), an avatar 50 was affected (e.g., a collision with an environmental object 37 or virtual object), etc. If YES (i.e., the gameplay has in fact ended) then the method may end. If NO, then the method may continue to Step 812.

In Step 812, the processing unit 7 determines if the vehicle 1 is traveling based on the vehicle data. That is, the processing unit 7 may determine if the vehicle 1 is parked based on the vehicle data. Alternatively, the processing unit 7 may determine if the vehicle 1 has reached a familiar destination or the end of a navigational route based on the navigational data of the vehicle data. If YES (i.e., the vehicle 1 is traveling), the method may return to Step 806. If NO, the method may continue to Step 814.

In Step 814, the processing unit 7 sends a request to determine whether a user of the gameplay would prefer to continue the gameplay. The request may be made through the plurality of mobile devices 13 or the infotainment module 9 of the vehicle 1 and require user input 41. The request may be visual and/or audible and may include haptic feedback if applicable. If YES (i.e., continue the gameplay), the method may return to Step 806. If NO, the method may end.

Figure 9:
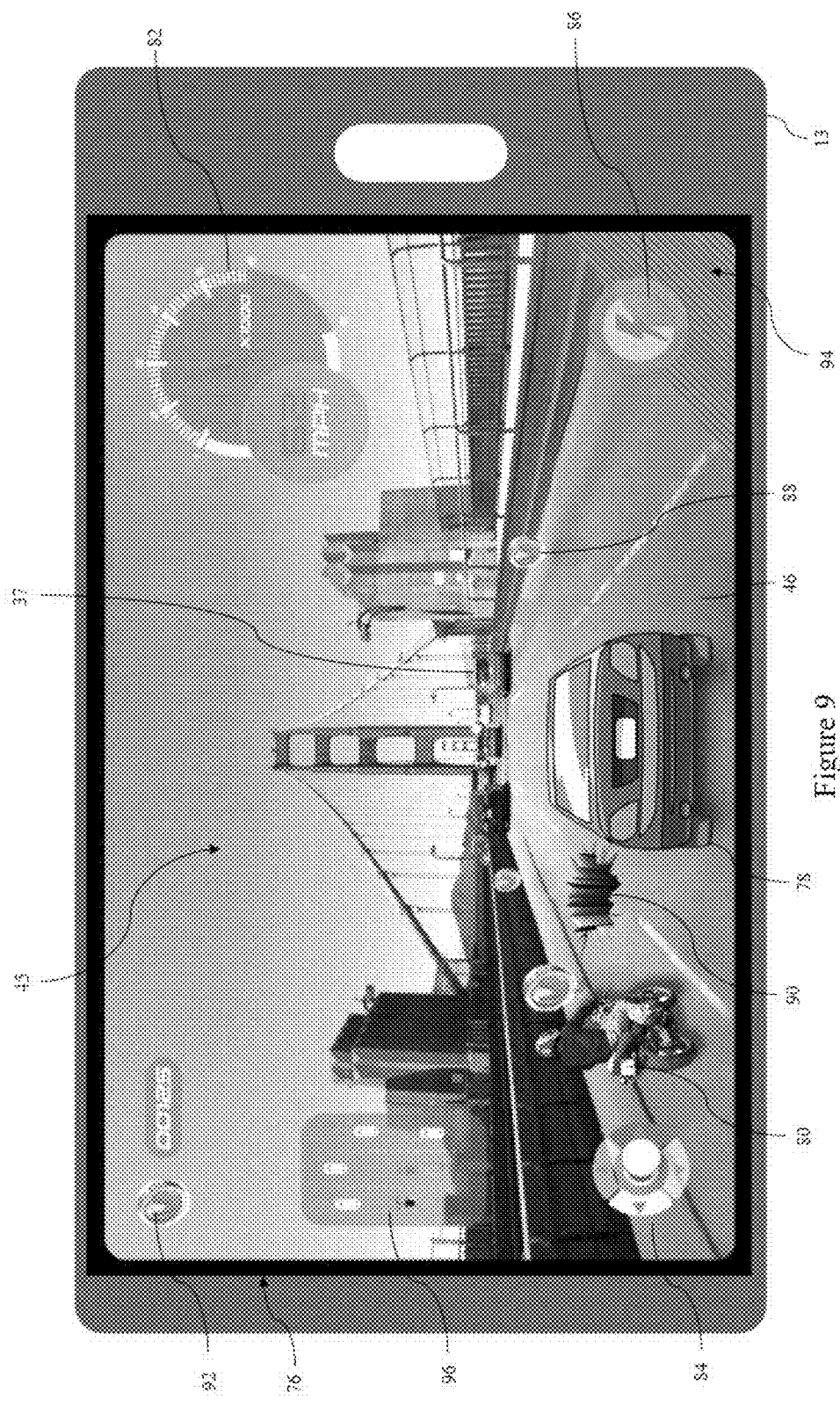
FIG. 9 shows a system in accordance with one or more embodiments disclosed herein.

FIG. 9 shows a visualization of an exemplary gameplay as seen on a mobile device 13 in accordance with one or more embodiments. Here, the mobile device 13 is depicted as a smartphone. However, in one or more embodiments, the mobile device 13 may be a tablet or a mobile gaming device. Each mobile device 13 may be in wireless communication with the processing unit 7 of the system 23. In addition, in one or more embodiments, the gameplay may be displayed on an infotainment module 9 of the vehicle 1. In this way, mobile devices 13 may control the gameplay seen through the display system 19 of the infotainment module 9.

In FIG. 9, the gameplay is displayed to a user of the system 23 through the display screen 76 of a mobile device 13. The gameplay of the system 23 employs a mixed-reality environment 45 as described in FIGS. 3-7. As previously discussed, the mixed-reality environment 45 of the gameplay includes a series of augmented image frames 43 that include environmental objects 37 and superimposed virtual objects. The locale of the mixed-reality environment 45 is the external environment of the vehicle 1 captured by the plurality of detection sensors 5 of the vehicle 1. Here, in FIG. 9, the locale of the mixed-reality environment 45 of the gameplay is a roadway 46 across a bridge.

In one or more embodiments, the gameplay may be multiplayer. To this end, the mixed-reality environment 45 may feature multiple avatars 50. Each avatar 50 may be controlled by the vehicle data and user input 41 through different mobile devices 13. In this way, if multiple passengers of the vehicle 1 are accessing the gameplay through respective mobile devices 13, each passenger may participate in the same gameplay. Alternatively, each passenger may participate in a gameplay that is separate from the gameplay of other passengers on their respective mobile device 13. In the case that multiple users are participating in the same gameplay, the mobile device 13 of each user may display the same view of the mixed-reality environment 45, including the same environmental objects 37 and the same virtual objects. In this way, users of multiplayer gameplays may compete with one another or work as a team when completing any challenges and activities of the gameplay. In one or more embodiments, multiplayer gameplays may be displayed via the display system 19 of the infotainment module 9 in order for multiple passengers of the vehicle 1 and/or users of the gameplay to view a single display screen 76 during the course of the gameplay.

In one or more embodiments, the mobile device 13 of each user may display differing perspectives of the mixed-reality environment 45 to each user of the gameplay. For example, in FIG. 9, a first user may control a first avatar 78 that is depicted as a car and a second user may control a second avatar 80 that is depicted as a motorcyclist. The mobile device 13 of the first user may display the mixed-reality environment 45 of the gameplay as seen on the mobile device 13 depicted in FIG. 9. However, the second user may adjust the settings of the gameplay on their respective mobile device 13 such that the mixed-reality environment 45 of the gameplay of the second user is displayed from a different perspective. Specifically, the perspective of the gameplay of the second user may be formed from a video feed captured by a different visual sensor 35 (e.g., different location along the vehicle 1, different lens parameters, etc.) than the visual sensor 35 that captured the video feed for the gameplay of the first user.

In one or more embodiments, one or more virtual objects may be virtual icons. Virtual icons are virtual objects that remain stationary in reserved areas of the display screen 76 of the mobile device 13. That is, virtual icons may be projected on the near plane 62 of the game-centric coordinate system 54. In this way, virtual icons are always depicted in front of virtual objects, environmental objects 37, and the current image frame.

Virtual icons may have several uses such as displaying gameplay information, displaying vehicle data, facilitating user input 41, etc. FIG. 9 depicts a few examples of virtual icons. A first virtual icon 82 is depicted as a speedometer that notifies the user of the gameplay a speed associated with the recorded vehicle data and/or the avatar 50 of the gameplay. A second virtual icon 84 and a third virtual icon 86 depict a toggle and a button, respectively, that facilitate user input 41 on mobile devices 13 with touchscreen capabilities. Accordingly, virtual icons may be employed to facilitate the activity and movements of an avatar 50.

In one or more embodiments, the display screen 76 of the mobile device 13 may be a touchscreen that is utilized to communicate user input 41 to the processing unit 7. Alternatively, a mobile device 13 may include physical controlling features (e.g., buttons, joysticks, etc.) that are utilized to facilitate user input 41 into the gameplay. Further, in one or more embodiments, a mobile device 13 may include accelerometers (not shown) to measure movements of the mobile device 13 and turn the measured movements into user input 41 for controlling the activity of an avatar 50. In this way, tilting of the mobile device 13 to the left and right may result in lateral movements of an avatar 50. In addition, tilting the mobile device 13 forward (i.e., away from the user) may result in acceleration of the avatar 50, while tilting the mobile device 13 back (i.e., towards the user) may result in the deceleration of the avatar 50.

The mixed-reality environment 45 of the gameplay depicted in FIG. 9 also includes virtual objects associated with the specific gameplay placed by the machine learning model 31 along the roadway 46 gameboard 64. Specifically, in this non-limiting example, virtual objects depicting coins 88 and a pothole 90 are placed along the roadway 46. Here, these virtual objects appear stationary within the gameplay as described previously in FIG. 6. That is, these virtual objects are moving in the game-centric coordinate system 54 towards the virtual camera 56 of the game-centric coordinate system 54 at the same speed that the vehicle 1 is traveling in the external environment. In the depicted gameplay, it may be an objective of the gameplay for the user to move the avatar 50 across the gameboard 64 such that the avatar 50 collects as many coins 88 as possible during the gameplay. A fourth virtual icon 92 of FIG. 9 depicts a scoreboard that records the number of virtual objects collected over the course of the gameplay. In one or more embodiments, the coins 88 and other virtual objects may disappear from the mixed-reality environment 45 upon collision with the avatar 50. In one or more embodiments, it may be an objective of the gameplay to avoid certain virtual objects and/or environmental objects 37. For example, in the depicted gameplay of FIG. 9, it may be an objective of the gameplay for the user to move the avatar 50 across the gameboard 64 such that the avatar 50 avoids potholes 90 while attempting to collect coins 88. In the instance that the avatar 50 collides with a pothole 90, a visual effect may be applied to the avatar 50 (e.g., the avatar 50 shakes, spins, flashes, etc.), the scoreboard may reset to zero, the game may end, etc.

In one or more embodiments, attributes of environmental objects 37 detected may be recorded by the plurality of detection sensors 5 of the vehicle 1. These recorded attributes of environmental objects 37 may be incorporated into the gameplay. For example, if an additional vehicle 48 in front of the vehicle 1 in the external environment is braking, has a turn signal on, is a specific color, changes lanes, etc., then this detection may trigger an event in the gameplay.

In one or more embodiments, an alert of a warning system (not shown) of the vehicle 1 may be incorporated into the gameplay. For example, if the vehicle 1 includes a blind spot warning system that is actively issuing an alert because an additional vehicle 48 is disposed within a defined blind spot of the vehicle 1, the gameplay may incorporate the alert to warn a user of the gameplay to avoid the space where an environmental object 37 associated with the additional vehicle 48 may appear in the mixed-reality environment 45. In this way, a collision between the avatar 50 and the environmental object 37 associated with the additional vehicle 48 is possibly avoided. The alert may be a visual alert 94 in the gameplay such as a glowing overlay, a flashing overlay, a virtual object or virtual icon, etc.

In one or more embodiments, the plurality of detection sensors 5 may detect and track lanes of a roadway 46 of the external environment (e.g., the number of lanes of the roadway 46, which lane of the roadway 46 the vehicle 1 is disposed within, the width of the lanes of the roadway 46, etc.). As such, the content augmentation engine 27 may place the lanes on the gameboard 64 in accordance with the lanes of the roadway 46. In this way, the placement of virtual objects may be done such that the virtual objects appear to be in the confines of the lanes. For example, as described in the point above, if an additional vehicle 48 is located in the blind spot on the right side of the vehicle 1, the visual alert 94 in the gameplay might be a colored overlay mapped on the surface of the right lane in the mixed-reality environment 45.

A fifth virtual icon 96 of FIG. 9 depicts a birds-eye perspective of the external environment or the mixed-reality environment 45. In one or more embodiments, the fifth virtual icon 96 may instead display a rear-view perspective of the external environment or the mixed-reality environment 45. This fifth virtual icon 96 allows the user of the gameplay to gain additional understanding of the position of environmental objects 37 and/or virtual objects along the gameboard 64 of the mixed-reality environment 45, even if all the environmental objects 37 and/or virtual objects are not yet visible from the current perspective of the avatar 50 in the gameplay.

In one or more embodiments, a perspective of the avatar 50 in the mixed-reality environment 45 may be adjusted by user input 41. Alternatively, the perspective may dynamically shift between different views of the mixed-reality environment 45 based on different video feeds captured by various visual sensors 35 of the plurality of detection sensors 5. For example, the initial perspective of the mixed-reality environment 45 may employ a series of image frames captured by a forward-facing visual sensor 35 located at the front end of the vehicle 1, but based on the activity of the avatar 50, the perspective of the mixed-reality environment 45 may change to employ a side-facing visual sensor 35 located along a side of the vehicle 1 and then to a rearward-facing visual sensor 35 located at the rear end of the vehicle 1 as the point of view of the avatar 50 shifts around the vehicle 1 with the position of the avatar 50 in the mixed-reality environment 45.

Figure 10:
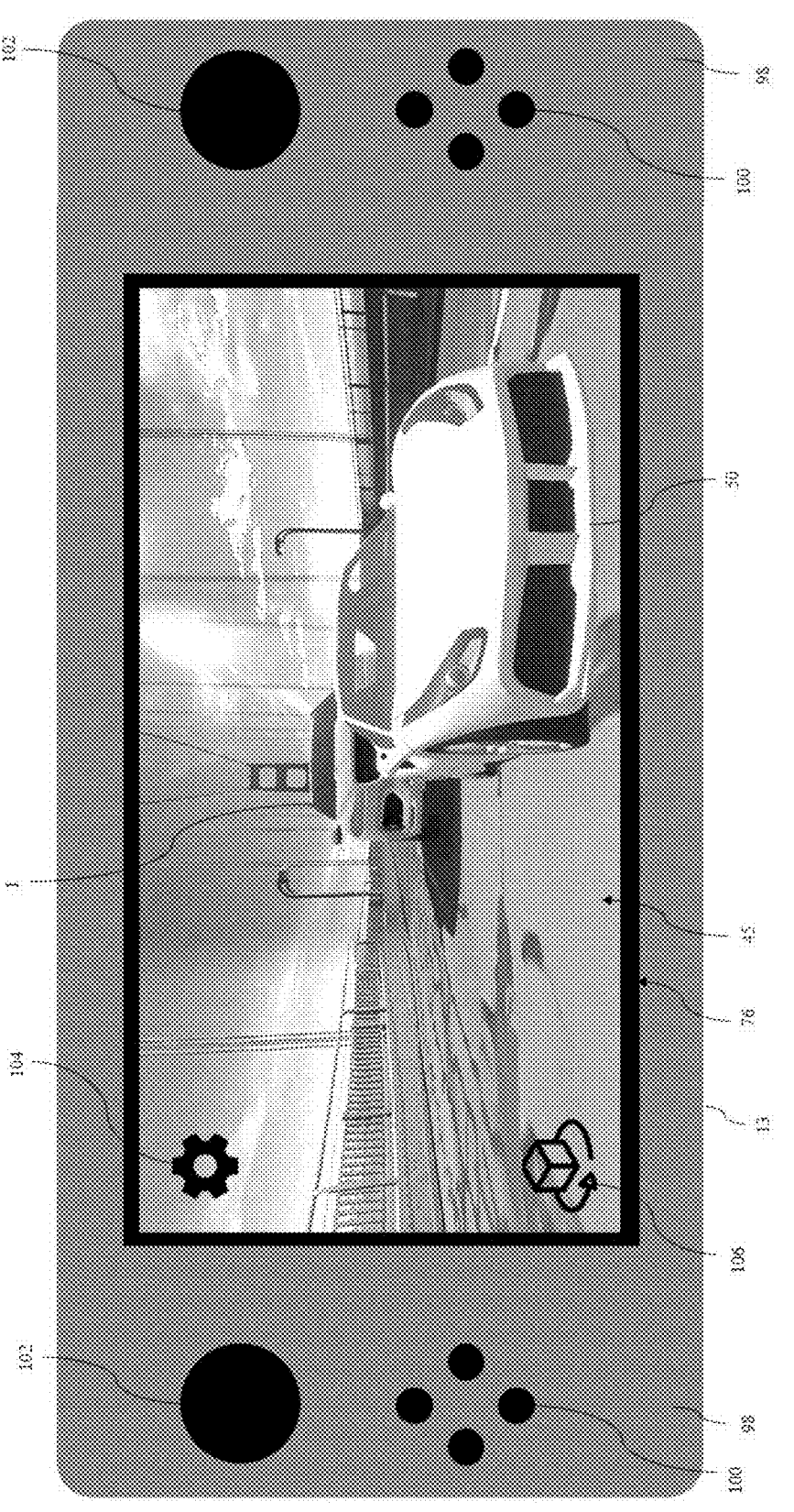
FIG. 10 shows a system in accordance with one or more embodiments disclosed herein.

In FIG. 10, the gameplay is displayed to a user of the system 23 through the display screen 76 of a mobile device 13 in accordance with one or more embodiments. Here, the mobile device 13 is a mobile gaming device. In this non-limiting example, the mobile gaming device includes a display screen 76 and a plurality of controllers 98. Each controller 98 of the mobile gaming device includes buttons 100 and a joystick 102 to facilitate user input 41 into the gameplay. Further, the display screen 76 of the mobile gaming device may be a touchscreen.

The mixed-reality environment 45 depicted in FIG. 10 displays a 3D bowl-view of an avatar 50. In one or more embodiments, the vehicle 1 may include a plurality of visual sensors 35 that capture 360-degree video feed coverage around the vehicle 1. Multicamera synthesis or the fusing of image frames captured by a plurality of visual sensors 35 capturing the 360-degree coverage around the vehicle 1 may create a bowl-view of the external environment.

In FIG. 10, the vehicle 1 is depicted as a virtual object behind the avatar 50 because the plurality of visual sensors 35 capturing the 360-degree coverage around the vehicle 1 cannot capture the vehicle 1 directly. Further, the avatar 50 is depicted in the mixed-reality environment 45 such that the avatar 50 may obscure portions of the vehicle 1 to provide a more realistic view to a user of the gameplay.

By employing the bowl-view, a user of the gameplay may view the avatar 50 from any perspective within the bowl. That is, the perspective of the avatar 50 within the mixed-reality environment 45 is adjustable between a top-view, front-view, rear-view, side-view, and angled-view. In addition, the bowl-view permits the avatar 50 to be controlled in front, behind, or to the side of the virtual object representing the vehicle 1.

In order to adjust the perspective of the avatar 50, the user may select a desired perspective by adjusting one or more settings of the gameplay through user input 41. In the non-limiting example of FIG. 10, the mixed-reality environment 45 includes a settings virtual icon 104 depicting a shortcut to the settings of the gameplay. The user may press a button 100 associated with the settings on a controller 98 or touch the settings virtual icon 104 in order to access the settings. In one or more embodiments, the mixed-reality environment 45 may include an orientation virtual icon 106. If the user desires to change the perspective of the avatar 50, the user may touch and drag the orientation virtual icon 106, which rotates the avatar 50 around a center point (not shown) of the avatar 50.

Figure 11:
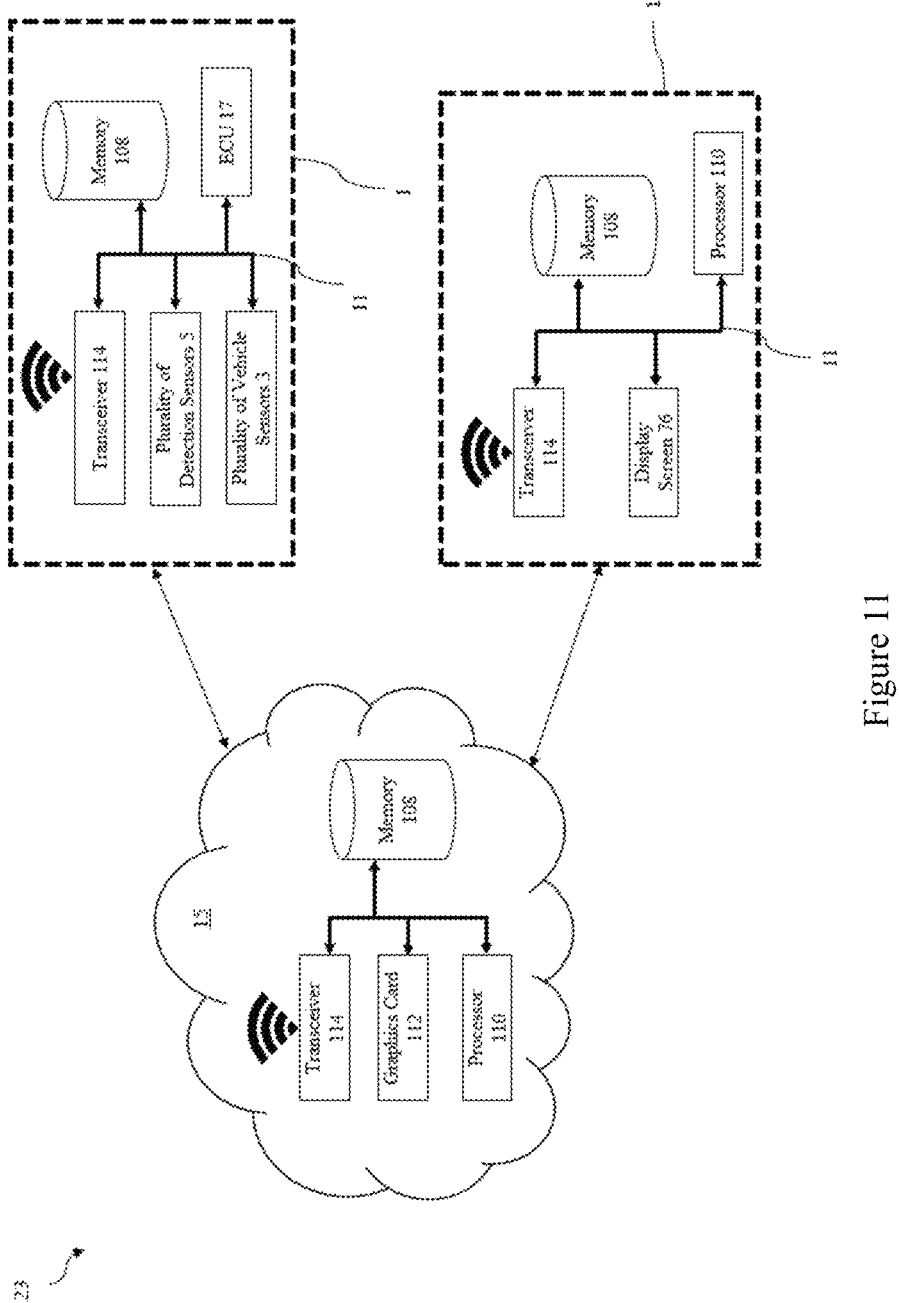
FIG. 11 shows a system in accordance with one or more embodiments disclosed herein.
Figure 12:
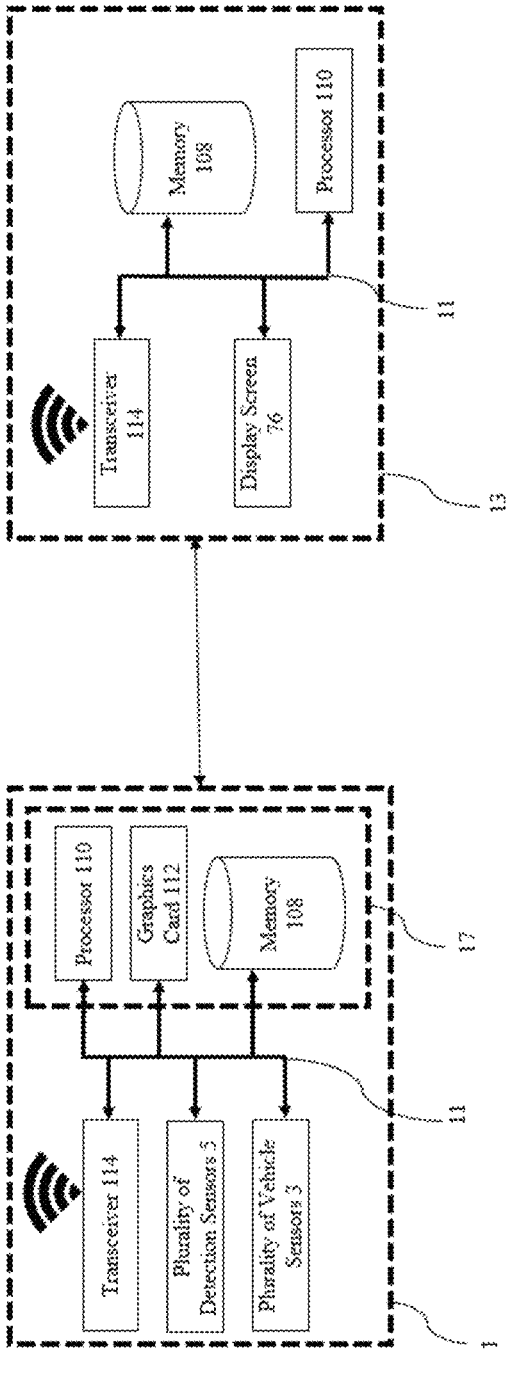
FIG. 12 shows a system in accordance with one or more embodiments disclosed herein.

FIGS. 11 and 12 depict system overviews of an automotive mixed-reality gaming system 23 for a vehicle 1 in accordance with one or more embodiments of the invention. In FIG. 11, the system 23 includes a vehicle 1, a processing unit 7, and one or more mobile devices 13. The vehicle 1 includes a plurality of detection sensors 5, which may be visual sensors 35 such as a camera, radar unit, LIDAR unit, ultrasonic sensor, or other equivalent sensors known to a person of ordinary skill in the art. In addition, the vehicle 1 includes a plurality of vehicle sensors 3, which may include a navigational sensor. As described above, the plurality of detection sensors 5 and the plurality of vehicle sensors 3 capture and transmit environmental data 33 and vehicle data, respectively, to an ECU 17 of the vehicle 1, which may be formed of one or more processors, microprocessors, or equivalent computing structures that perform processing of the various environmental data 33 and vehicle data described herein. The environmental data 33 and the vehicle data is transmitted to the ECU 17 by way of a bus 11, which may be in the form of wires, wiring harnesses, circuit boards, or equivalent means to interconnect the various components of the vehicle 1. The ECU 17 may include components for hardware-accelerated video processing, including machine learning-based video processing. Accordingly, the ECU 17 processes the environmental data 33 and vehicle data using algorithms and processes to extract context information such as information of environmental objects 37 and the location, speed, and direction of the vehicle 1 from the captured data.

After capturing the environmental data 33 and vehicle data, the ECU 17 and/or the plurality of detection sensors 5 and the plurality of vehicle sensors 3 transmit the environmental data 33 and vehicle data, respectively, to a memory 108 of the vehicle 1. This memory 108 is a non-transitory storage medium such as flash memory, Random Access Memory (RAM), a Hard Disk Drive (HDD), a solid state drive (SSD), a combination thereof, or equivalent. In addition to storing the captured environmental data 33 and vehicle data, the memory 108 stores inputs, outputs, functions, and processes necessary to execute gameplay applications, user interactions (via a mobile device 13 or the infotainment module 9), and other functions and processes described herein. Further, in one or more embodiments, the memory 108 of the vehicle 1 may also store gameplay applications themselves.

In FIG. 11, the vehicle 1 is in wireless communication with a server 15 including a processing unit 7. The server 15 is a cloud-based server 15 and is configured to perform augmentation and/or other operations in order to create a mixed-reality environment 45 of a gameplay featuring the captured environmental data 33 and the vehicle data. Specifically, the server 15 includes a cloud-based instance of a developer kit that facilitates the development of mixed-reality applications. The processing unit 7 includes tools, such as a processor 110, for processing a series of image frames, other environmental data 33, and/or the vehicle data obtained in either raw or pre-processed form. The processing unit 7 of the server 15 may perform the object detection process via a dedicated component such as a graphics card 112. In one or more embodiments, the object detection process may be performed by the ECU 17 and then transmitted to the server 15.

The processing unit 7 of the server 15 also includes a memory 108 that holds data for the server 15 or other components (or a combination of both) that can be connected to the server 15 (e.g., the ECU 17 and mobile devices 13). For example, the memory 108 may be a database storing data consistent with this disclosure. A machine learning model 31 including an environment interpretation engine 25, a content augmentation engine 27, a rendering engine 29 may be present within the memory 108 of the processing unit 7 and exist for the rendering of a 2.5D output as previously discussed in FIGS. 6 and 7. In one or more embodiments, the content augmentation engine 27 and/or the rendering engine 29 of the machine learning model 31 may be present within a memory 108 of the plurality of mobile devices 13, the infotainment module 9, and/or the ECU 17 of the vehicle 1. Although illustrated as a single memory 108 in FIG. 11, multiple memories 108 may be used according to particular needs, desires, or particular implementations of the server 15 and the described functionality.

Further, the server 15 includes a transceiver 114, which wirelessly transmits and receives signals to and from transceivers 114 of the vehicle 1 and a mobile device 13 of the user. Example embodiments of the transceiver 114 include an antenna (not shown) and processor 110 that transmit and receive radar, radio, cellular, satellite, Wi-Fi, or other equivalent signals. The vehicle 1 and the mobile device 13 may be part of a network of vehicles 1 and mobile devices 13, in which case the transceiver 114 of the server 15 may transmit or receive signals of different and/or multiple signal types.

The gameplay of the system 23 is transmitted by signals from the server 15 to the mobile device 13. The server 15 receives user input 41 as transmitted signals from the mobile device 13 (e.g., to manipulate associated prompts, control the activity of avatars 50 within the gameplay, etc.). Each mobile device 13 may include a bus 11, a display screen 76, a memory 108, a processor 110, and a transceiver 114. The mobile device 13 is capable of capturing user input 41, which is relayed back to the processing unit 7. The user input 41 may be captured via physical controlling features of the mobile device 13 (e.g., buttons 100, joysticks 102, etc.), accelerometers (not shown) of the mobile device 13, or as touch input if the display screen 76 of the mobile device 13 features touchscreen capabilities. The gameplay may be accessible through an application on the mobile device 13, or, similarly, through a web interface, dedicated server, or other equivalent software. Such software is hosted by the server 15, on the vehicle 1 via the ECU 17, on the mobile device 13, or a combination thereof. Accordingly, the user is able to manipulate and interact with the mixed-reality environment 45 of the gameplay by interacting with the mobile device 13.

In one or more embodiments, and as depicted in FIG. 12, the processing unit 7 may be a component of the ECU 17 of the vehicle 1. At least some operations of processing unit 7 (e.g., environment interpretation, rendering, etc.) when embodied as the ECU 17 may benefit from the availability of a GPU or graphics card 112. Accordingly, the ECU 17 may be equipped with a GPU or graphics card 112. In addition, the ECU 17 may still be in wireless communication with an external server for downloading of an application, servicing of an application, etc.

As such, in the embodiment of FIG. 12, the gameplay of the system 23 is transmitted by signals from the vehicle 1 to the mobile device 13. The vehicle 1 transmits received user input 41 from the mobile device 13 to the ECU 17 for execution. In one or more embodiments, the gameplay may be transmitted from the ECU 17 to the infotainment module 9 of the vehicle 1 via the bus 11.

FIG. 13 depicts a flowchart 1300 of a method for operating an automotive mixed-reality gaming system 23 for a vehicle 1 in accordance with one or more embodiments disclosed herein. Steps of the flowchart shown in FIG. 13 may be performed by an automotive mixed-reality gaming system 23 as described herein but are not limited thereto. The constituent steps of the method depicted in FIG. 13 may be performed in any logical order, and the method is not limited to the sequence presented.

As depicted in FIG. 13, the method initiates at Step 1310, which includes employing a plurality of vehicle sensors 3 of a vehicle 1 to measure vehicle data of the vehicle 1. The vehicle data is associated with the movements and position of the vehicle 1 as the vehicle 1 travels within an external environment. In one or more embodiments, the vehicle data collected includes the current speed, acceleration, steering angle, yaw rate, braking status, blind-spot and proximity alerts, etc.

The plurality of vehicle sensors 3 may include a navigational sensor that receives a signal including global coordinates of the vehicle 1. The navigational sensor may be a GPS sensor, for example, or an equivalent sensor that determines the location of the vehicle 1 in relation to the external environment of the vehicle 1, and may employ trilateration, triangulation, or similar procedures to determine the position thereof. The signal may also include information such as the direction and speed of the vehicle 1.

In Step 1320, a plurality of detection sensors 5 capture environmental data 33 of the external environment of the vehicle 1. The environmental data 33 may be captured while the vehicle 1 is stationary or mobile. The plurality of detection sensors 5 of the vehicle 1 may be positioned along the front end, rear end, and/or sides of the vehicle 1 and be in the form of a two-dimensional camera, a three-dimensional or stereoscopic camera, a radar unit, a LIDAR unit, an ultrasonic sensor, or an equivalent sensor or component that perceives the environment of the vehicle 1. The plurality of detection sensors 5 along the vehicle 1 may all be the same type of detection sensor 5 or include a combination of detection sensors 5 that vary in type.

In one or more embodiments, the plurality of detection sensors 5 includes a plurality of visual sensors 35. Each visual sensor 35 may capture a video feed associated with a field of view of the external environment of the vehicle 1. To this end, each video feed may be formed of a series of image frames.

Further, the environmental data 33 collected by the plurality of detection sensors 5 may include several different views of a roadway 46 the vehicle 1 is located upon, as well as additional vehicles 48, obstacles, pedestrians, signs, and other landmarks in the vicinity of the vehicle 1.

In Step 1330, the vehicle data and environmental data 33 are transmitted to the processing unit 7 of the system 23. In one or more embodiments, the processing unit 7 is located in a cloud-based server 15 and includes a processor 110 and a memory 108. In this way, the plurality of vehicle sensors 3 and the plurality of detection sensors 5 may transmit the vehicle data and environmental data 33, respectively, to the processing unit 7 of the server 15 in raw or pre-processed form. Alternatively, the plurality of vehicle sensors 3 and the plurality of detection sensors 5 may transmit the vehicle data and environmental data 33, respectively, to an ECU 17 of the vehicle 1 wirelessly or via a bus 11 of the vehicle 1. The ECU 17 of the vehicle 1 may be formed of one or more processors, microprocessors, Integrated Circuits (IC) or equivalent computing structures. Accordingly, the vehicle data and the environmental data 33 may be processed by the ECU 17 prior to being transmitted to the server 15. Further, in one or more embodiments, the processing unit 7 is included within the ECU 17 of the vehicle 1 and may process the vehicle data and the environmental data 33 subsequent to the ECU 17 receiving the vehicle data and the environmental data 33.

In Step 1340, the environmental data 33 received by the processing unit 7 is converted to a game-centric coordinate system 54. In this way, environmental objects 37 are identified in the series of image frames of the environmental data 33 by the environment interpretation engine 25. The environment interpretation engine 25 may employ deep learning-based image processing such as OmniDet, Single-Shot Deep MANTA, Single Shot Detection (SSD), Region-based Convolutional Neural Network (R-CNN), You Only Look Once (YOLO) Single Shot Detection, Fast R-CNN, Histogram of Oriented Gradients (HOG), etc. The resulting output of the deep learning-based image processing may include a depth estimation, a semantic segmentation, visual odometry, motion segmentation, and/or object detection of the environmental objects 37.

Subsequently, a post-processing of the identified environmental objects 37 may be performed. That is, necessary data manipulations are performed, in order to obtain boundaries for identified environmental objects 37. In addition, a 2D or 3D bounding polygon is formed for each identified environmental object 37. These bounding polygons are given a location relative to the vehicle 1 within a game-centric coordinate system 54 formed by the developer kit of the processing unit 7. To this end, the bounding polygons are placed along a gameboard 64 of the game-centric coordinate system 54 and positioned such that the location of the associated environmental objects 37 is relative to the vehicle 1 in 3D space.

In Step 1350, a gameplay including a mixed-reality environment 45 that utilizes the environmental data 33 is formed. The mixed-reality environment 45 of the gameplay may be generated in real-time based on the actual external environment surrounding the vehicle 1. In particular, the mixed reality environment includes a series of image frames of the external environment with various augmentations. The augmentation content 39 to be added to the mixed-reality environment 45 depends on the intended gameplay of the mixed-reality environment 45. Augmentation content 39 includes objects to be added, modification of content in the image frame by masking, etc. Objects to be added include, for example, one or more avatars 50, objects, symbols, labels, features, animated characters, text, etc.

In one or more embodiments, a rendering engine 29 receives the series of image frames and the augmentation content 39 from a content augmentation engine 27 and generates a series of augmented image frames 43. In one or more embodiments, the rendering of the augmented image frames 43 may be performed based on input including each image frame itself, the identified environmental objects 37, and the augmentation content 39. Input that may affect the rendering may further be received from a user. For example, the user may change the view to be rendered by a control command, by steering control movements, etc.

In addition, the content augmentation engine 27 and rendering engine 29 may place virtual objects within the game-centric coordinate system 54 for purposes of the selected gameplay. For example, in one or more embodiments, the gameplay may include certain environmental objects 37 and/or virtual objects as augmentation content 39 to be avoided and/or collected that penalize or reward a user of the system 23 based upon the identity of the augmentation content 39. In addition, and in Step 1360, an avatar 50 is included within the mixed-reality environment 45 for the gameplay. An avatar 50 is a virtual object and element of a gameplay that is controlled by user input 41 and vehicle data. Further, an avatar 50 may be represented as any virtual object (e.g., a motor vehicle, an airplane, a human, an animal, etc.). In one or more embodiments, the avatar 50 is configured to traverse the mixed-reality environment 45 in a direction at a rate proportional to the vehicle 1.

In Step 1370, the gameplay (i.e., the series of augmented image frames 43 of the mixed-reality environment 45) is displayed on a plurality of mobile devices 13 and/or the infotainment module 9 of the vehicle 1. The plurality of mobile devices 13 may be embodied as smart phones, tablets, and mobile gaming devices. In one or more embodiments, the plurality of mobile devices 13 are connected to the vehicle 1 by wired or wireless technologies (e.g., WiFi, Bluetooth, etc.). Alternatively, both the vehicle 1 and the plurality of mobile devices 13 may be connected to the cloud-based server 15 of the processing unit 7 via wireless technologies (e.g., cellular, 4G, 5G, satellite, etc.).

If the rendering of the gameplay is performed for multiple users, the augmented image frames 43 may be displayed on multiple mobile devices 13. In one or more embodiments, a mobile device 13 of the plurality of mobile devices 13 may be located outside of the vehicle 1 and communicate with the server 15 or vehicle 1.

In addition to displaying the gameplay to a user of the system 23, the plurality of mobile devices 13 capture user input 41 in order to control activity within the gameplay and/or adjust one or more settings of the gameplay. In Step 1380, the processing unit 7 receives user input 41 from the plurality of mobile devices 13. The user input 41 may be captured via physical controlling features of the mobile device 13 (e.g., buttons 100, joysticks 102, etc.), accelerometers (not shown) of the mobile device 13, or as touch input if the display screen 76 of the mobile device 13 features touchscreen capabilities.

In Step 1390, the processing unit 7 controls the activity of the avatar 50 within the game-centric coordinate system 54, and thus the mixed-reality environment 45, based on the user input 41 received. For example, the user input 41 may be steering commands that control the position, orientation, movement, etc., of an avatar 50. In turn, the processing unit 7 will cause the position, orientation, movement, etc., of the avatar 50 to update according to the user input 41 within the game-centric coordinate system 54 and the mixed-reality environment 45. In addition, the user input 41 may adjust one or more settings of the gameplay. For example, the one or more settings that may be adjusted are the perspective of the virtual camera 56 of the mixed-reality environment 45, the weather, the physics of the gameplay (e.g., gravity, acceleration across the gameboard 64 of the game-centric coordinate system 54, etc.), damage allowance or health of the avatar 50, amount/frequency/type of additional virtual objects introduced in the gameplay, etc.

Furthermore, the processing unit 7 updates and controls the activity (e.g., position, speed, etc.) of the avatar 50 based on received vehicle data. In one or more embodiments, the avatar 50 is configured to traverse the mixed-reality environment 45 in a direction at a rate proportional to the vehicle 1. Therefore, if the vehicle 1 accelerates in the external environment, the processing unit 7 may ensure that the avatar 50 of the user accelerates in the game-centric coordinate system 54, and thus, the mixed-reality environment 45 in a manner similar to the vehicle 1.

During the course of the gameplay, the processing unit 7 updates the gameplay and the mixed-reality environment 45 based on the latest environmental data 33, vehicle data, and user input 41. In one or more embodiments, the processing unit 7 determines if the gameplay has ended. That is, the processing unit 7 determines if the gameplay was paused/canceled by user input 41, the end of the gameplay was reached (e.g., by winning/losing a game, by time limit, etc.), an avatar 50 was affected (e.g., a collision with an environmental object 37 or virtual object), etc. In one or more embodiments, the processing unit 7 sends a request to the user via a display screen 76 of a mobile device 13 to determine whether the user of the gameplay would prefer to continue the gameplay. If the gameplay has ended or been ended by the user, then the method ends. If the gameplay has not ended, then the method may continue at Step 1310 in order to update the gameplay.

Accordingly, embodiments disclosed herein relate to systems 23 and methods useful for operating an automotive mixed-reality gaming system 23 for a vehicle 1. The disclosed systems 23 and methods may advantageously be played on mobile devices 13 of passengers of the vehicle 1. Further, the disclosed systems 23 and methods advantageously provide the plurality of mobile devices 13 with pre-processed APIs and augmented image frames 43. In addition to employing vehicle data within a gameplay of the gaming system 23, the disclosed systems 23 and methods advantageously utilize a plurality of video feeds captured by a plurality of detection sensors 5 of the vehicle 1 as a backdrop for the gameplay. Moreover, the disclosed systems 23 and methods advantageously implement environmental objects 37 and weather conditions of the external environment of the vehicle 1 detected by the plurality of detection sensors 5 as interactive elements within the gameplay.

Although only a few embodiments of the invention have been described in detail above, those skilled in the art will readily appreciate that many modifications are possible in the example embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. An automotive mixed-reality gaming system for a vehicle, comprising:
    a plurality of vehicle sensors configured to collect vehicle data associated with movements and a position of the vehicle along a roadway;
    a plurality of detection sensors configured to collect environmental data associated with an external environment of the vehicle; and
    a processing unit comprising a processor and a memory, the processing unit configured to:
        receive the vehicle data from the plurality of vehicle sensors;
        receive the environmental data from the plurality of detection sensors;
        convert the environmental data to a game-centric coordinate system;
        generate a gameplay of an interactive gameplay application stored in the memory, the gameplay comprising a mixed-reality environment based on the game-centric coordinate system;
        depict a virtual avatar within the game-centric coordinate system, the avatar being configured to traverse the mixed-reality environment in a direction at a rate proportional to the vehicle;
        transmit the gameplay to a plurality of mobile devices, wherein the gameplay is a multiplayer gameplay such that a plurality of virtual avatars controlled by the plurality of mobile devices are depicted in the mixed-reality environment;
        receive user input from the plurality of mobile devices; and
        control activity of the avatar and adjust one or more settings of the gameplay based on the vehicle data and the user input.

2. The automotive mixed-reality gaming system of claim 1, wherein an Electronic Control Unit (ECU) of the vehicle comprises the processing unit.

3. The automotive mixed-reality gaming system of claim 1, wherein a server configured to receive the vehicle data and the environmental data via a wireless data connection comprises the processing unit.

4. The automotive mixed-reality gaming system of claim 1, wherein the game-centric coordinate system comprises a plurality of projection planes and is configured to depict environmental objects identified by the processing unit from the environmental data in a three-dimensional space.

5. The automotive mixed-reality gaming system of claim 1, wherein the processing unit is further configured to modify the mixed-reality environment of the gameplay based on the position of the vehicle within the external environment.

6. The automotive mixed-reality gaming system of claim 1, wherein the vehicle data comprises at least one of the following:
    a speed of the vehicle;
    a direction of the vehicle;
    an acceleration of the vehicle; and
    an alert of a warning system of the vehicle.

7. The automotive mixed-reality gaming system of claim 1, wherein the gameplay comprises interaction with virtual objects superimposed into the mixed-reality environment by the processing unit.

8. The automotive mixed-reality gaming system of claim 1, wherein the processing unit is further configured to adjust the one or more settings of the gameplay based on weather conditions of the external environment of the vehicle, the weather conditions being received and determined by the processing unit from the environmental data, an external server, and the user input.

9. The automotive mixed-reality gaming system of claim 1, further comprising an infotainment module, the infotainment module comprising:
    a display system configured to receive and display the gameplay; and
    an interface configured to select the one or more settings of the gameplay.

10. The automotive mixed-reality gaming system of claim 1, wherein the plurality of detection sensors comprises a plurality of visual sensors configured to capture a plurality of video feeds, and a perspective of the avatar dynamically shifts between the plurality of video feeds based on the activity of the avatar.

11. The automotive mixed-reality gaming system of claim 1, wherein the avatar is depicted in a bowl-view in the mixed-reality environment such that a perspective of the avatar within the mixed-reality environment is adjustable between a top-view, front-view, rear-view, side-view, and angled-view of the avatar based on the user input.

12. A method for operating an automotive mixed-reality gaming system for a vehicle, comprising:
    collecting vehicle data associated with movements and a position of the vehicle along a roadway;
    collecting environmental data associated with an external environment of the vehicle;

transmitting the vehicle data and the environmental data to a processing unit;

converting the environmental data to a game-centric coordinate system;

generating a gameplay of an interactive gameplay application stored in a memory, the gameplay comprising a mixed-reality environment based on the game-centric coordinate system;

depicting a virtual avatar within the game-centric coordinate system, the avatar being configured to traverse the mixed-reality environment in a direction at a rate proportional to the vehicle;

transmitting the gameplay to a plurality of mobile devices, wherein the gameplay is a multiplayer gameplay such that a plurality of virtual avatars controlled by the plurality of mobile devices are depicted in the mixed-reality environment;

receiving user input from the plurality of mobile devices; and controlling activity of the avatar and adjusting one or more settings of the gameplay based on the vehicle data and the user input.

13. The method according to claim 12, wherein converting the environmental data to the game-centric coordinate system comprises:

obtaining an image frame from the environmental data;

identifying at least one environmental object in the image frame;

determining an augmentation content based on the at least one environmental object; and rendering an augmented image frame based on the image frame and the augmentation content.

14. The method according to claim 12, wherein converting the environmental data to the game-centric coordinate system comprises depicting at least one environmental object identified from the environmental data in a three-dimensional space.

15. The method according to claim 12, further comprising modifying the mixed-reality environment of the gameplay based on the position of the vehicle.

16. The method according to claim 12, further comprising adjusting the one or more settings of the gameplay based on weather conditions of the external environment of the vehicle, the weather conditions being received and determined by the processing unit from the environmental data, an external server, and the user input.

17. The method according to claim 12, further comprising transmitting the gameplay to a display system of an infotainment module.

18. The method according to claim 12, wherein transmitting the gameplay to a plurality of mobile devices comprises transmitting the gameplay wirelessly.

19. The method according to claim 12, further comprising dynamically shifting a perspective of the avatar between a plurality of video feeds of the environmental data based on the activity of the avatar.

* * * * *